(12) United States Patent
Tanaka

(10) Patent No.: US 7,706,078 B2
(45) Date of Patent: Apr. 27, 2010

(54) LASER LIGHT IRRADIATION APPARATUS AND LASER LIGHT IRRADIATION METHOD

(75) Inventor: Koichiro Tanaka, Kanagawa (JP)

(73) Assignee: Semiconductor Energy Laboratory Co., Ltd., Kanagawa-Ken (JP)

( * ) Notice: Subject to any disclaimer, the term of this patent is extended or adjusted under 35 U.S.C. 154(b) by 223 days.

(21) Appl. No.: 11/896,821

(22) Filed: Sep. 6, 2007

(65) Prior Publication Data
US 2008/0174864 A1    Jul. 24, 2008

(30) Foreign Application Priority Data
Sep. 14, 2006   (JP)   .............. 2006-248975

(51) Int. Cl.
G02B 15/14   (2006.01)
H01S 3/08    (2006.01)

(52) U.S. Cl. ...................... 359/679; 372/101

(58) Field of Classification Search .......... 359/679, 359/689–692; 438/166
See application file for complete search history.

(56) References Cited

U.S. PATENT DOCUMENTS

| | | | |
|---|---|---|---|
| 4,353,617 A * | 10/1982 | Tokumitsu et al. | .......... 359/690 |
| 4,942,586 A | 7/1990 | Lai | |
| 5,225,924 A | 7/1993 | Ogawa et al. | |
| 5,537,258 A | 7/1996 | Yamazaki et al. | |
| 5,617,243 A | 4/1997 | Yamazaki et al. | |
| 5,815,494 A | 9/1998 | Yamazaki et al. | |
| 6,373,870 B1 | 4/2002 | Yamazaki et al. | |
| 6,426,840 B1 | 7/2002 | Partanen et al. | |
| 6,558,991 B2 | 5/2003 | Yamazaki et al. | |
| 7,050,878 B2 | 5/2006 | Yamazaki et al. | |
| 7,138,306 B2 | 11/2006 | Tanaka et al. | |
| 7,352,789 B2 | 4/2008 | Tanaka | |
| 7,499,145 B2 * | 3/2009 | Orino | .......... 355/67 |
| 2003/0058916 A1 | 3/2003 | Tanaka et al. | |

(Continued)

FOREIGN PATENT DOCUMENTS

DE    101 44 244 A1    3/2003

(Continued)

OTHER PUBLICATIONS

Search Report (Application No. 07000062.5-2217; EP9335) Dated May 2, 2007.

Primary Examiner—Jordan M. Schwartz
(74) Attorney, Agent, or Firm—Nixon Peabody LLP; Jeffrey L. Costellia

(57) ABSTRACT

An object is to provide a laser light irradiation apparatus and a laser light irradiation method which reduce errors of an irradiation position of laser light to an irradiated object and allow irradiation with laser light of any size when the irradiated object is irradiated with the laser light through a beam expander optical system. One feature of a laser light irradiation apparatus of the present invention is to include a laser oscillator; a beam expander optical system having a zoom function; and a correction lens disposed to conjugate the laser oscillator and the beam expander optical system including at least a first lens, a second lens, and a third lens in order in a traveling direction of the laser light, wherein the second lens and the third lens are cooperated with each other in accordance with the magnification of the laser light.

26 Claims, 14 Drawing Sheets

U.S. PATENT DOCUMENTS

| | | | |
|---|---|---|---|
| 2003/0213787 A1* | 11/2003 | Dunsky et al. | 219/121.75 |
| 2004/0257669 A1 | 12/2004 | Koehler | |
| 2005/0111497 A1 | 5/2005 | Tanaka | |
| 2006/0119949 A1 | 6/2006 | Tanaka et al. | |
| 2007/0160096 A1 | 7/2007 | Tanaka | |
| 2008/0165822 A1 | 7/2008 | Tanaka | |

FOREIGN PATENT DOCUMENTS

| | | |
|---|---|---|
| EP | 0 627 643 A2 | 12/1994 |
| JP | 07-041845 | 2/1995 |

* cited by examiner

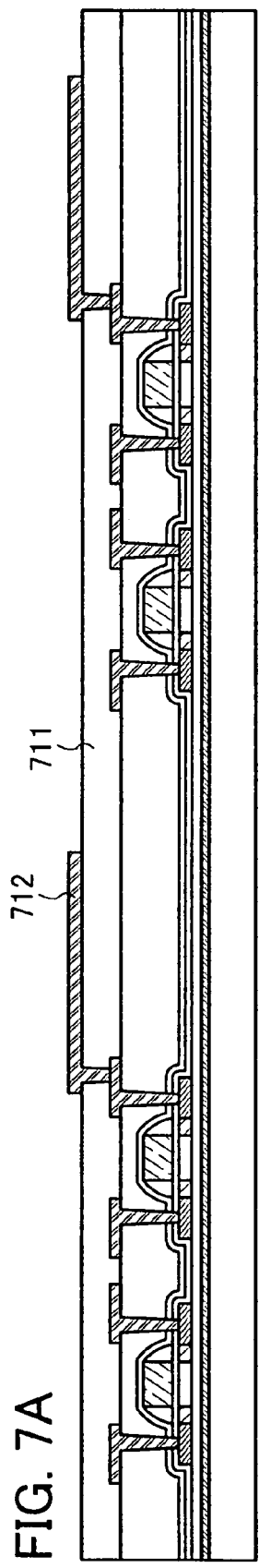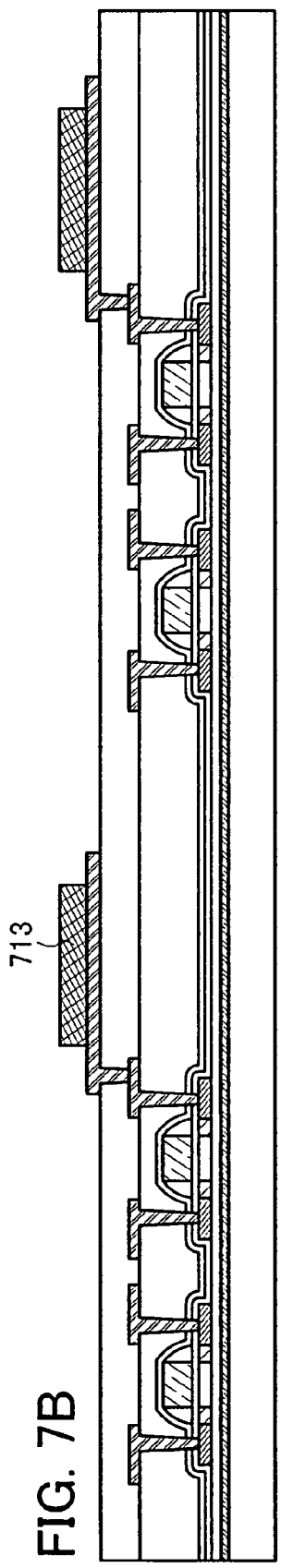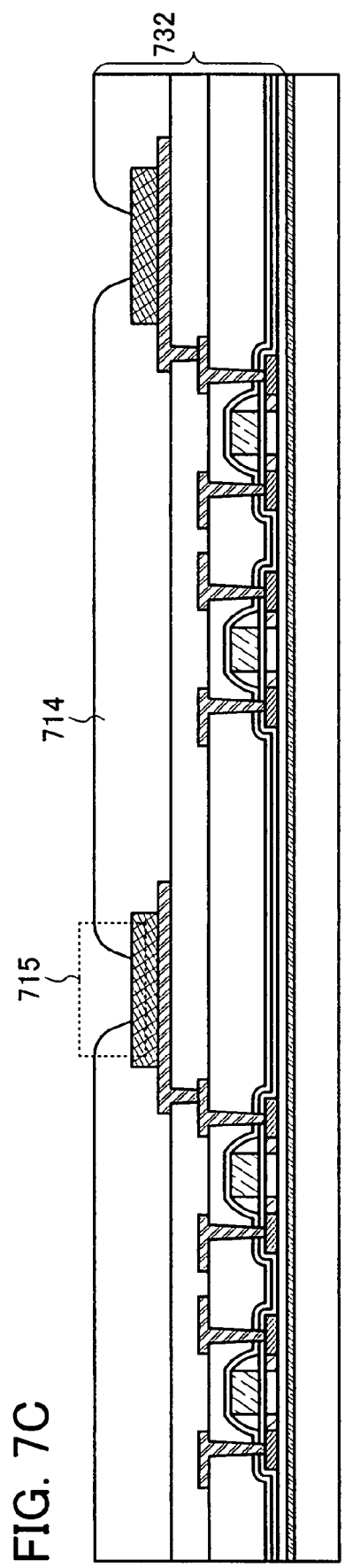

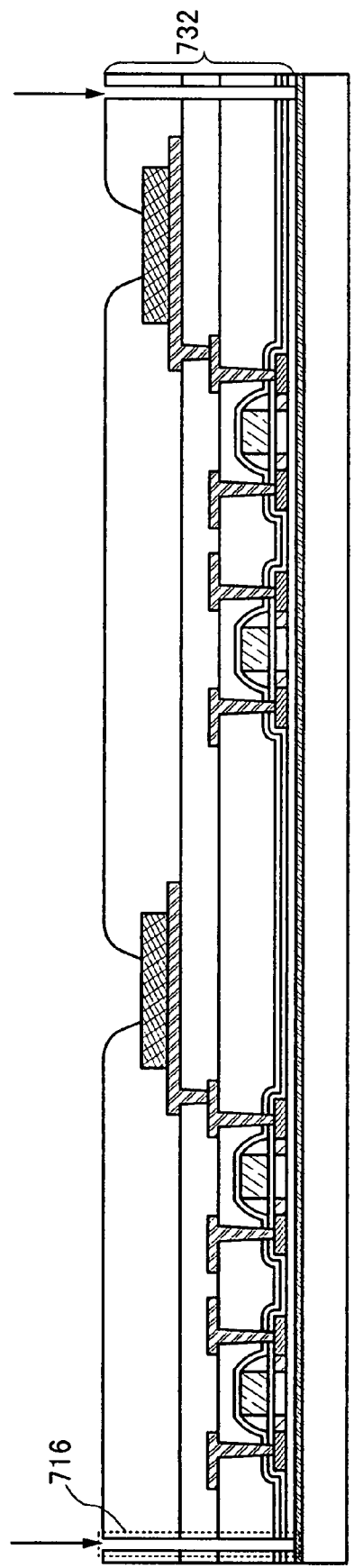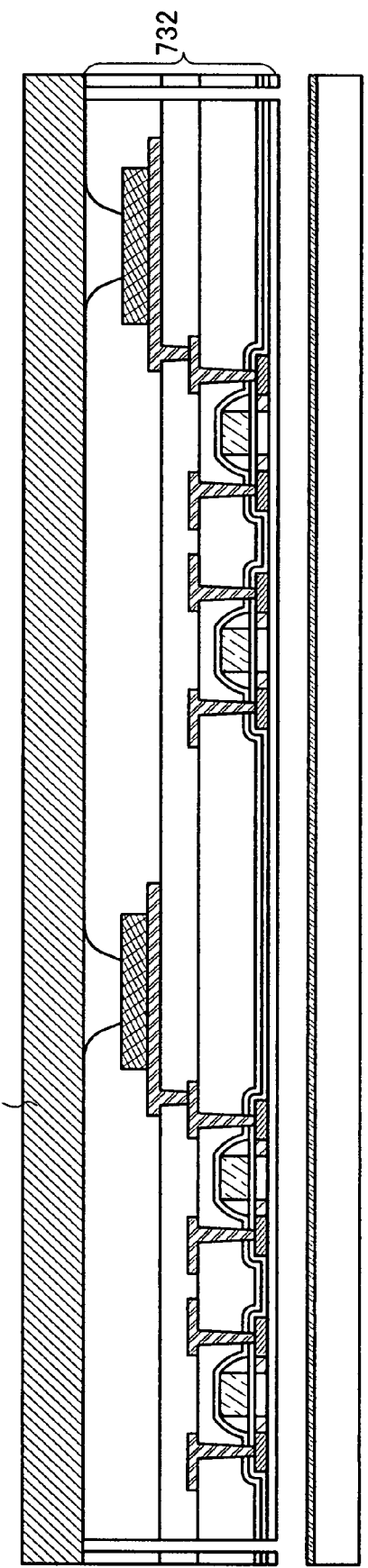

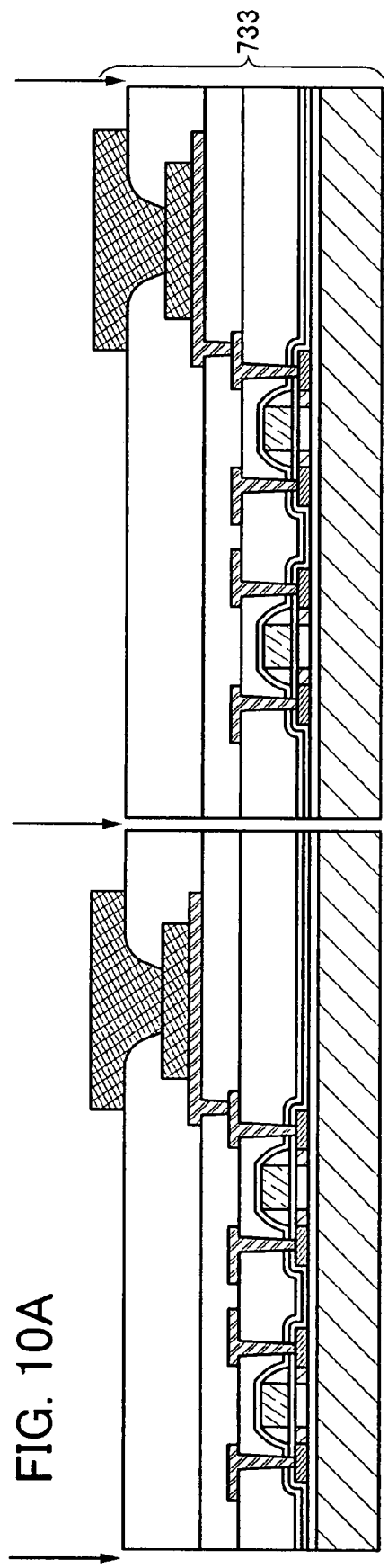
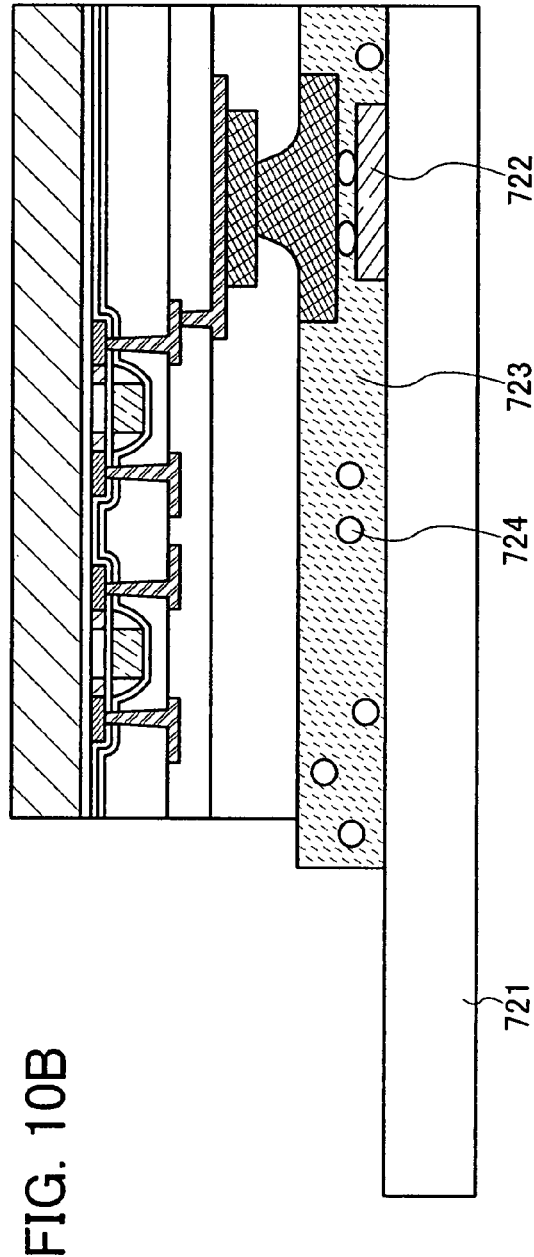
FIG. 10A
FIG. 10B

LASER LIGHT IRRADIATION APPARATUS AND LASER LIGHT IRRADIATION METHOD

BACKGROUND OF THE INVENTION

1. Field of the Invention

The present invention relates to a laser light irradiation apparatus and a laser light irradiation method, and particularly relates to a laser light irradiation apparatus and a laser light irradiation method using a beam expander optical system.

2. Description of the Related Art

Recently, a technique for manufacturing a thin film transistor (hereinafter referred to as a TFT) over a substrate has been drastically advanced and developed for being applied to an active matrix display device. In particular, a TFT using a polycrystalline semiconductor film has a higher electron field-effect mobility (also referred to as a mobility) than a conventional TFT using an amorphous semiconductor film, so that high-speed operation is possible. Therefore, the control can be carried out by a driver circuit which is formed over the same substrate on which a pixel portion is formed, although the control of a pixel portion has been conventionally carried out by a driver circuit which is provided outside a substrate on which the pixel portion is formed.

As a substrate used for a semiconductor device, a glass substrate is expected more than a quartz substrate and a single-crystalline semiconductor substrate in terms of cost. However, the glass substrate has poor heat resistance and is easily deformed by heat. Therefore, when a semiconductor film is crystallized in order to form a TFT using a polycrystalline semiconductor film over a glass substrate, a method for crystallizing a semiconductor film by laser light irradiation is often used to avoid thermal deformation of the glass substrate.

Features of the crystallization of a semiconductor film by laser light are that, compared with an annealing method utilizing radiation heating or conductive heating, processing time can be drastically reduced, and a semiconductor substrate or a semiconductor film over a substrate is selectively or locally heated so that the substrate is hardly thermal-damaged, for example.

Generally, laser light (also referred to as a laser beam) oscillated from a laser oscillator has a Gaussian spatial intensity distribution. Therefore, in the case where an irradiated object is directly irradiated with laser light oscillated from a laser oscillator, the energy distribution varies in an irradiated region. For example, when crystallization or improvement of film quality is conducted by irradiating a semiconductor film including silicon or the like with laser light, if the semiconductor film is directly irradiated with laser light having a Gaussian spatial intensity distribution, the energy distribution is different in a central portion and an edge portion of an irradiated region, so that melt time of the semiconductor film varies. Consequently, crystallinity of the semiconductor film is nonuniform, and a semiconductor film having a desired characteristic cannot be obtained.

Accordingly, in general, after the spatial intensity distribution of laser light oscillated from a laser oscillator is uniformed by using some kind of laser light shaping means, an irradiated object is irradiated with the laser light. For example, as the laser light shaping means, a beam expander optical system is widely used (for example, see Patent Document 1: Japanese Published Patent Application No. H741845)

A conventional beam expander optical system is, as illustrated in FIG. 5, composed of two lenses 1102a and 1102b, which are disposed so that an optical distance from lens 1102a to lens 1102b is $f_1+f_2$ when the focal length of lens 1102a and 1102b are $f_1$ and $f_2$, respectively. Accordingly, laser light 1105 emitted from a laser oscillator 1101 passes through a beam expander optical system 1102 to be expanded to $f_2/f_1$ times and projected onto an irradiated surface. At this time, for example, a diffractive optical element 1104 is disposed behind the beam expander optical system 1102, so that a desired shaped laser light can be obtained.

Since a diffractive optical element is generally an element which has a minute and complicated structure, it is necessary to make laser light enter the extremely proper position at the diffractive optical element. Reduction in a diameter of a diffractive optical element is extremely difficult at present; therefore a method in which laser light is propagated to the diffractive optical element after the laser light is expanded by the beam expander optical system or the like as described above is employed.

SUMMARY OF THE INVENTION

Laser light which enters a conventional beam expander optical system is emitted with the size of a beam diameter changed according to magnification X of the beam expander optical system. At this time, if the laser light enters precisely the center of the lens 1102a located at an entrance of the beam expander optical system, the expanded laser light is emitted from the center of the lens 1102b located at an emission point of the beam expander optical system and the laser light precisely enters diffractive optical element 1104 (see FIG. 5).

However, laser light is unstable light of which an optical path changes depending on a laser oscillator itself or the state of use environment such as temperature changes. Therefore, when laser light enters a beam expander optical system, there is a possibility that errors of an incident position at a diffractive optical element can be caused since the laser light does not precisely enter the center of a first lens.

For example, with X as magnification of a beam expander optical system, if an incident position at the first lens is shifted from the center of the lens by a distance d, an ejection position of the laser light emitted from the second lens is made to be a position shifted from the center of the lens by a distance Xd. That is, an error of an incident position of the laser light to the beam expander optical system is enlarged by the same ratio as the enlargement magnification of the laser light and undesirably cause an error of an ejection position. Accordingly, the incident position at the diffractive optical element is also shifted by the distance Xd. Thus, in the case of using a diffractive optical element which needs a precise irradiation position, there has been a problem in that a laser light with a desired performance can not be obtained.

Further, a beam diameter at an emission point of a laser oscillator is different in size depending on individual differences of laser oscillators. For example, in the case where there is a defect or the like in a laser oscillator, the laser oscillator needs to be exchanged. At that time, if a beam diameter of laser light oscillated from the laser oscillator changes, a bean diameter at an incident position at the beam expander optical system changes, and therefore the size of the laser light having passed through the beam expander optical system at an irradiated surface changes. Thus, in order to obtain the same size laser light as the laser light obtained before exchanging the laser oscillator at the irradiated surface, the magnification of the beam expander optical system has to be changed. That is, a beam expander optical system has to be replaced whenever a laser oscillator is exchanged, which is ineffective. In addition, since the magnification of a beam expander optical system is normally fixed, the size of laser light having passed through the beam expander optical system at an irradiated surface has been fixed in accordance with the magnification of the beam expander optical system. Therefore, when the size of the laser light having passed through the beam expander optical system at the irradiated surface is intentionally changed, the beam expander optical system has had to be replaced.

In consideration of the above-described problem, it is an object of the present invention to provide a laser light irradiation apparatus and a laser light irradiation method which can reduce errors of an irradiation position of a laser light to an irradiated object and allow irradiation with laser light of any size without replacing the beam expander optical system when an irradiated object is irradiated with the laser light through the beam expander optical system.

One feature of a laser light irradiation apparatus of the present invention is to include a laser oscillator; a beam expander optical system having a zoom function; and a correction lens disposed to conjugate the laser oscillator and the beam expander optical system, where the beam expander optical system includes at least three lenses, and when the lenses are a first lens, a second lens, and a third lens in order in a traveling direction of the laser light, the second lens and the third lens are cooperated with each other in accordance with the magnification of the laser light.

Another feature of a laser light irradiation apparatus of the present invention is to includes a laser oscillator; a beam expander optical system having a zoom function; and a correction lens disposed to conjugate the laser oscillator and the beam expander optical system, where the beam expander optical system includes a first lens, a second lens, and a third lens in order in a traveling direction of the laser light oscillated from the laser light, the first lens is a concave lens, the second lens is a lens with which moves in such a direction that a distance between the first lens and the second lens is changed to enlarge or reduce a beam diameter of the laser light, the third lens is a lens which is cooperated with the second lens to make the laser light parallel, and when an emission point of the laser oscillator is a first conjugate point, a point at which an image at the first conjugate point is formed through the correction lens is a second conjugate point, a distance between the correction lens and the second conjugate point is B, a focal length of the first lens is f, and a distance between the correction lens and the first lens is X, X satisfies $B-3|f| \leq X \leq B+|f|$. It is to be noted that a concave lens used in this specification may be any optical element which has a similar function to a concave lens.

In addition, in the above-described structure of the laser light irradiation apparatus of the present invention, X preferably satisfies $X=B-|f|$.

In addition, in the above-described structure of the laser light irradiation apparatus of the present invention, a distance between the laser oscillator and the first lens is preferably greater than or equal to 0.5 m, more preferably, greater than or equal to 1 m.

Further, Another feature of a laser light irradiation apparatus of the present invention is to includes a laser oscillator; a beam expander optical system having a zoom function; and a correction lens disposed to conjugate the laser oscillator and the beam expander optical system, where the beam expander optical system includes a first lens, a second lens, and a third lens in order in a traveling direction of the laser light oscillated from the laser light, the first lens is a convex lens, the second lens is a lens with which moves in such a direction that a distance between the first lens and the second lens is changed to enlarge or reduce a beam diameter of the laser light, the third lens is a lens which is cooperated with the second lens to make the laser light parallel, and when an emission point of the laser oscillator is a first conjugate point, a point at which an image at the first conjugate point is formed through the correction lens is a second conjugate point, a distance between the correction lens and the second conjugate point is B, a focal length of the first lens is f, and a distance between the correction lens and the first lens is X, X satisfies $B-f \leq X \leq B+3f$. It is to be noted that a convex lens used in this specification may be any optical element which has a similar function to a convex lens.

In addition, in the above-described structure of the laser light irradiation apparatus of the present invention, X preferably satisfies $X=B-f$.

In addition, in the above-described structure of the laser light irradiation apparatus of the present invention, a distance between the laser oscillator and the first lens is preferably greater than or equal to 0.5 m, more preferably, greater than or equal to 1 m.

In addition, in the above-described structure of the laser light irradiation apparatus of the present invention, the third lens is a convex lens.

In addition, in the above-described structure of the laser light irradiation apparatus of the present invention, the correction lens is a convex lens.

In addition, in the above-described structure of the laser light irradiation apparatus of the present invention, a diffractive optical element which laser light passing through the beam expander optical system enters is disposed.

It is to be noted that, in the above-described structure, when a focal length of the correction lens is f' and a distance between the first conjugate point and the correction lens is A, the relation between A, B, and f' satisfies $1/A+1/B \approx 1/f'$.

One feature of a laser light irradiation method of the present invention is to include the steps of emitting laser light from a laser oscillator; making the laser light enter a correction lens; and making the laser light emitted from the correction lens enter a first lens, a second lens, and a third lens included in a beam expander optical system having a zoom function in order, where the first lens is a concave lens, the second lens is a lens with which moves in such a direction that a distance between the first lens and the second lens is changed to enlarge or reduce a beam diameter of the laser light, the third lens is a lens which is cooperated with the second lens to make the laser light parallel, and when an emission point of the laser oscillator is a first conjugate point, a point at which an image at the first conjugate point is formed through the correction lens is a second conjugate point, a distance between the correction lens and the second conjugate point is B, a focal length of the first convex lens is f, and a distance between the correction lens and the first lens is X, the laser oscillator, the correction lens, and the first lens are disposed so that X satisfies $B-3|f| \leq X \leq B+|f|$.

In addition, in the above-described structure of the laser light irradiation method of the present invention, the laser light is emitted with the laser oscillator, the correction lens, and the concave lens disposed so that X preferably satisfies $X=B-|f|$.

In addition, in the above-described structure of the laser light irradiation method of the present invention, the laser light is emitted with a distance between the laser oscillator and the concave lens or a distance between the laser oscillator and the first lens of preferably greater than or equal to 0.5 m, and more preferably, greater than or equal to 1 m.

Further, another feature of a laser light irradiation method of the present invention is to include the steps of emitting laser light from a laser oscillator; making the laser light enter a correction lens; and making the laser light emitted from the correction lens enter a first lens, a second lens, and a third lens included in a beam expander optical system having a zoom function in order, where the first lens is a convex lens, the second lens is a lens with which moves in such a direction that a distance between the first lens and the second lens is changed to enlarge or reduce a beam diameter of the laser light the third lens is a lens which is cooperated with the second lens to make the laser light parallel, and when an emission point of the laser oscillator is a first conjugate point, a point at which an image at the first conjugate point is formed through the correction lens is a second conjugate point, a distance between the correction lens and the second conjugate point is B, a focal length of the first lens is f, and a distance between the correction lens and the first lens is X, the laser oscillator, the correction lens, and the first lens are disposed so that X satisfies $B-f \leq X \leq B+3f$.

In addition, in the above-described structure of the laser light irradiation method of the present invention, the laser light is emitted with the laser oscillator, the correction lens and the convex lens disposed so that X preferably satisfies $X=B+f$.

In addition, in the above-described structure of the laser light irradiation method of the present invention, the laser light is emitted with a distance between the laser oscillator and the first lens of preferably greater than or equal to 0.5 m, and more preferably, greater than or equal to 1 m.

In addition, in the above-described structure of the laser light irradiation method of the present invention, a convex lens is used as the third lens.

In addition, in the above-described structure of the laser light irradiation method of the present invention, a convex lens is used as the correction lens.

In addition, in the above-described structure of the laser light irradiation method of the present invention, laser light having passed through the beam expander optical system enters a diffractive optical element.

In the case where laser light enters an irradiated object after a scale of the laser light oscillated from a laser oscillator is enlarged by a beam expander optical system having a zoom function, a correction lens which corrects an optical path is provided between the laser oscillator and the beam expander optical system. Consequently, shift of an incident position of the laser light to the beam expander optical system is reduced, and further the laser light can be propagated onto a proper position at the next irradiated surface of the beam expander system. Moreover, variations in a beam diameter depending on individual differences of laser oscillators can be corrected by the zoom function included in the beam expander optical system.

BRIEF DESCRIPTION OF THE DRAWINGS

In the accompanying drawings:

FIGS. 7A to 7C illustrate an example of a method for manufacturing a semiconductor device, using a laser light irradiation apparatus of the present invention;

FIGS. 8A and 8B illustrate an example of a method for manufacturing a semiconductor device, using a laser light irradiation apparatus of the present invention;

FIGS. 10A and 10B illustrate an example of a method for manufacturing a semiconductor device, using a laser light irradiation apparatus of the present invention;

DETAILED DESCRIPTION OF THE INVENTION

Figure 1:
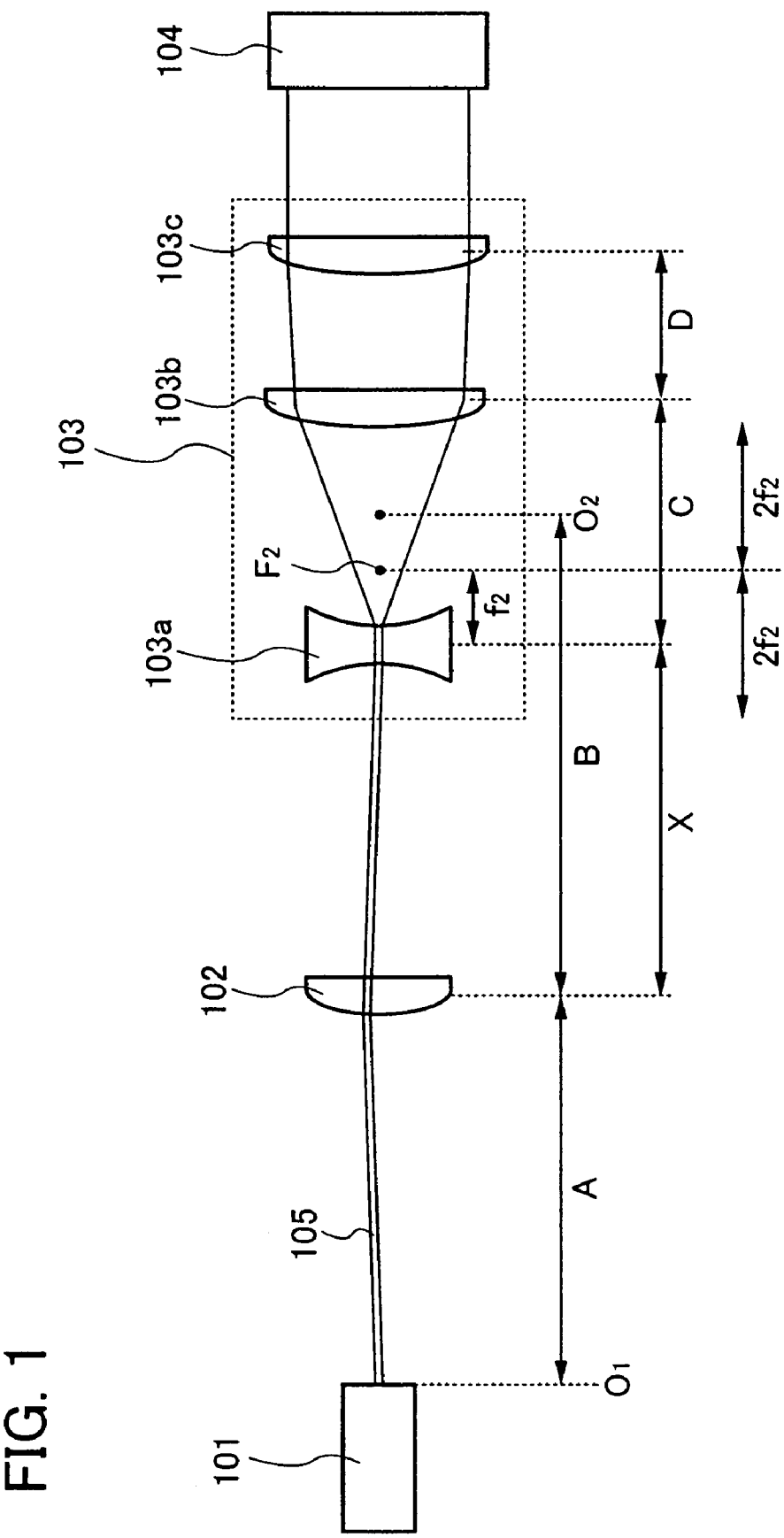
FIG. 1 illustrates an example of a laser light irradiation apparatus of the present invention.

Embodiment Modes of the present invention will be hereinafter described with reference to the drawings. It is to be noted that it is easily understood by those skilled in the art that the present invention is not limited to the following description and various changes may be made in forms and details without departing from the purpose and the scope of the invention. Therefore, the present invention should not be interpreted as being limited to the descriptions of the embodiment modes below. It is to be noted that, in a structure of the present invention described below, the same reference numerals may be used in common in the same components or components having the same function.

Embodiment Mode 1

Embodiment Mode 1 will describe one example of a laser light irradiation apparatus and a laser light irradiation method of the present invention with reference to the drawings.

First, FIG. 1 illustrates a structural example of a laser light irradiation apparatus described in this embodiment mode. The laser irradiation apparatus illustrated in FIG. 1 includes at least a laser oscillator 101, a correction lens 102 which corrects an optical path and a beam expander optical system 103 provided with a zoom function. After laser light 105 oscillated from the laser oscillator 101 is propagated to the beam expander optical system 103 through the correction lens 102 and passes through the beam expander optical system 103 to increase a scale thereof, irradiated object 104 is irradiated with the laser light 105 (see FIG. 1).

The beam expander optical system of this embodiment mode includes at least three lenses. In the bean expander optical system 103 illustrated in FIG. 1, a first lens 103a, a second lens 103b, and a third lens 103c are disposed in order in a traveling direction of the laser light 105 oscillated from the laser oscillator 101. Although FIG. 1 illustrates an example of using a biconcave lens as the first lens 103a, a plano-convex lens as the second lens 103b, and a plano-convex lens as the third lens 103c, the lenses to be used are not limited to these. As the first lens 103a, any kind of concave lens can be used: for example, a concave lens such as a plano-concave lens or a concave meniscus lens, or an optical element having an equivalent function to that of the concave lens may be used. As the third lens 103c, any kind of convex lens can be used: for example, a convex lens such as a biconvex lens or a convex meniscus lens, or an optical element having an equivalent function to that of the convex lens may be used. Besides, as the second lens 103b, any kind of spherical lens can be used: for example, a biconvex lens, a convex meniscus lens, a biconcave lens, a plano-concave lens, a concave meniscus lens, or the like may be used. Alternatively, a combination lens including two or more lenses may be used as each lens.

As the laser oscillator 101, a continuous-wave laser oscillator (CW laser oscillator) such as a $YVO_4$ laser, a quasi-CW laser oscillator, or the like can be used. For example, the following laser can be applied: an Ar laser, a Kr laser, a $CO_2$ laser, or the like as a gas laser, or a YAG laser, a YLF laser, a $YAlO_3$ laser, a $GdVO_4$, an alexandrite laser, a Ti:sapphire laser, a $Y_2O_3$ laser, or the like as a solid-state laser. In addition, a YAG laser, a $Y_2O_3$ laser, a $GdVO_4$ laser, and $YVO_4$ laser may be a ceramics laser. As a metal vapor laser, a helium-cadmium laser or the like is given. Alternatively, a disk laser may be used. The disc laser has a feature in that cooling efficiency is excellent due to a disc shaped laser medium; that is, energy efficiency and beam quality are excellent.

Laser light emitted from the above-described laser oscillator is preferably oscillated in $TEM_{00}$, so that a linear beam spot obtained at an irradiated surface can have higher uniformity of energy.

When laser light enters the beam expander optical system 103, an irradiation position of the laser light having passed through the beam expander optical system 103 is significantly affected by shift of an incident position. However, if an incident angle to the beam expander optical system 103 is somewhat shifted, the irradiation position of the laser light having passed through the beam expander optical system 103 is not affected. Thus, even in the case where the incident angle of the laser light to the beam expander optical system 103 is changed, if the laser light enters an optimal position at the beam expander optical system 103, the laser light is propagated from a certain position and angle to the next irradiated surface. That is, the incident position is more important than the incident angle of the laser light to the beam expander optical system 103.

Therefore, the correction lens 102 is disposed so as to conjugate the laser oscillator 101 and the first lens 103a located at an entrance of the beam expander optical system 103 in order to keep the incident position constant. Thus, by propagating the laser light oscillated from the laser oscillator 101 to the beam expander optical system 103 through the correction lens 102, the laser light of which an optical path is unstable can enter a proper position at the beam expander optical system 103, and further, it becomes possible to propagate the laser light also onto a proper position at a surface of the irradiated object 104. That is, the correction lens 102 is provided here for controlling the incident position of the laser light which enters the first lens 103a in the beam expander optical system 103.

The laser light having passed through the beam expander optical system 103 is propagated to the irradiated object 104. As the irradiated object 104, for example, a diffractive optical element can be used. The diffractive optical element is also referred to as diffractive optics or a diffractive optics element, which is an element for obtaining a spectrum with the utilization of light diffraction. Since the diffractive optical element is an element having a minute and complicated structure, laser light needs to enter the extremely proper position at the diffractive optical element. Generally, reduction in a diameter of the diffractive optical element is extremely difficult at present, and a method in which laser light is propagated to the diffractive optical element after the laser light is expanded by a beam expander optical system or the like is applied as a usage of the diffractive optical element. Accordingly, in the case where a beam expander optical system and a diffractive optical element are provided in combination, it is highly effective to dispose the correction lens 102 at a position where the laser oscillator 101 and the beam expander optical system 103 are conjugated as described above so as to reduce the shift of the incident position of the laser light which enters the diffractive optical element.

As the correction lens 102, a convex lens which condenses incident light can be used. Although an example of using a plano-convex lens as the correction lens 102 is illustrated in FIG. 1, a biconvex lens, a convex meniscus lens, or the like can be alternatively used. Alternatively, a cylindrical lens may be used. The cylindrical lens is a lens which has a curvature in one direction and can condense or diffuse light only in a one-dimensional direction. Accordingly, by providing a plurality of cylindrical lenses in combination and combining curvature directions of the cylindrical lenses, optical adjustment can be freely conducted.

Further, in the laser light irradiation apparatus described in this embodiment mode, in the case where the laser light oscillated from the laser oscillator 101 enters the first lens 103a of the beam expander optical system through the correction lens 102, when an emission point (or a beam waist or a light source) of the laser oscillator 101 is a first conjugate point $O_1$; a point at which an image at the first conjugate point $O_1$ is formed through the correction lens 102 is a second conjugate point $O_2$; a distance between the first conjugate point $O_1$ and the correction lens 102 is A; a distance between the correction lens 102 and the second conjugate point $O_2$ is B; a focal length of the first lens 103a is $f_2$; and a distance between the correction lens 102 and the first lens 103a is X, the first lens 103a is disposed so as to satisfy $B-3|f_2| \leq X \leq B+|f_2|$.

The disposition satisfying the above numerical expression further satisfies the relation that, when a focal point of the first lens 103a (here, a focal point of the first lens 103a located on the traveling direction side of the laser light) is $F_2$, the second conjugate point $O_2$ is located in the range of $2f_2$ in either the traveling direction of the laser light or the direction opposite to the traveling direction of the laser light from the focal point $F_2$ of the first lens 103a. The laser oscillator 101, the correction lens 102, the first lens 103a, and the like are disposed so that X satisfies such a relation; therefore incident errors of the laser light to the beam expander optical system can be reduced, and errors of the irradiation position of the laser light to the irradiated object 104 can be reduced.

Figure 2:
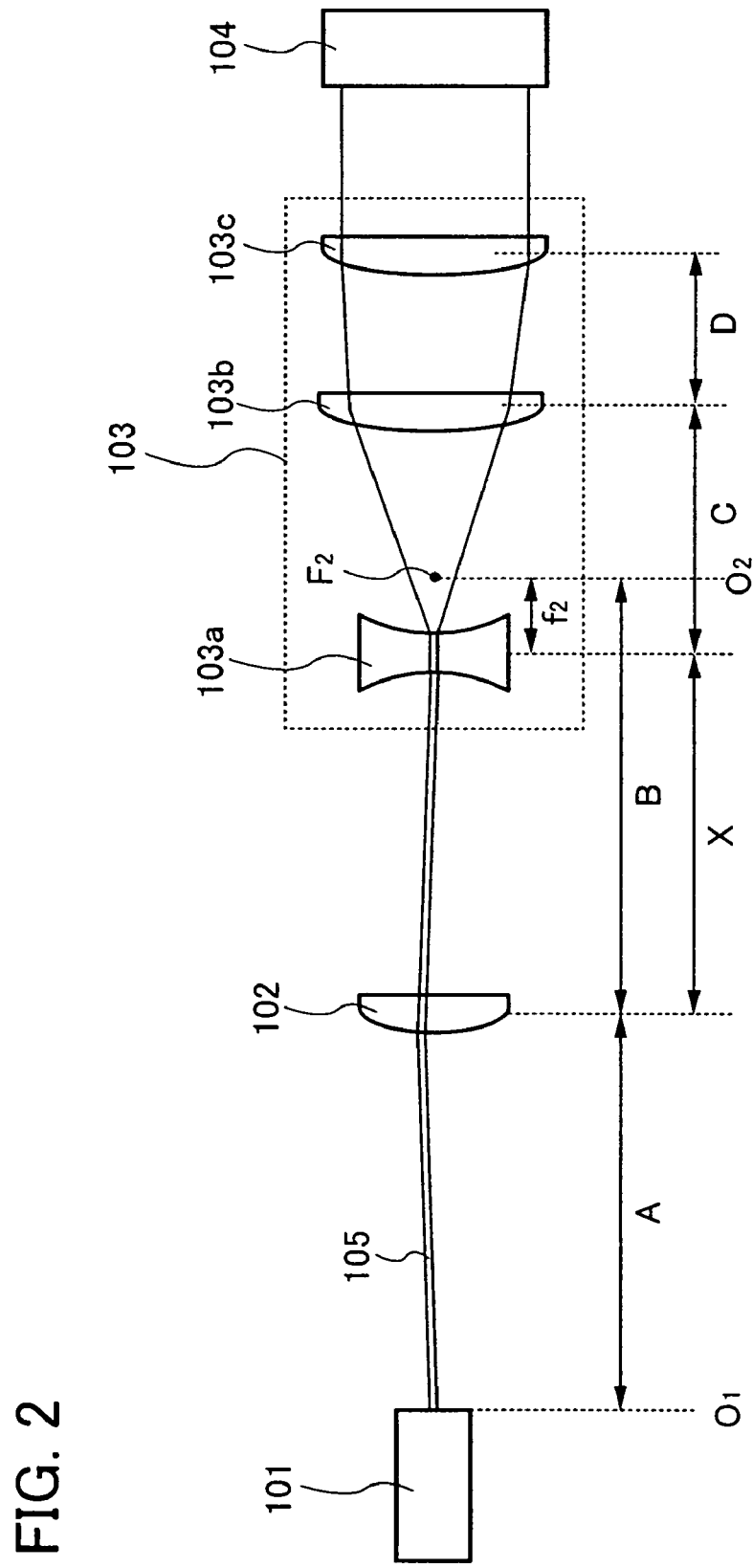
FIG. 2 illustrates an example of a laser light irradiation apparatus of the present invention.

It is to be noted that the first lens 103a is preferably provided so that the distance X for disposing the first lens 103a satisfies $X=B-f_2$ (see FIG. 2). That is, the first lens 103a is provided so that the second conjugate point $O_2$ is formed to correspond to the focal point $F_2$ of the first lens 103a (here, the focal point of the first lens 103a located on the traveling direction side of the laser light). In this case, when an irradiated object is irradiated with the laser light through the beam expander optical system, the errors of the irradiation position at the laser light to the irradiated object can be minimized.

In addition, when a focal length of the correction lens 102 is $f_1$, a distance between the first conjugate point $O_1$ and the correction lens 102 is A, and a distance between the correction lens 102 and the second conjugate point $O_2$ is B, the focal length $f_1$ of the correction lens 102 satisfies $1/A+1/B \approx 1/f_1$.

In the laser light irradiation apparatus described in this embodiment mode, the second lens 103b of the beam expander optical system 103 is provided in order to reduce or expand a spread angle of the laser light having passed through the first lens 103a. In addition, the third lens 103c is provided in order to make the laser light emitted from the second lens 103b parallel.

It is to be noted that, in the laser light irradiation apparatus described in this embodiment mode, the beam expander optical system 103 has a zoom function. Specifically, in FIG. 1, the second lens 103b of the beam expander optical system 103 is moved to change a distance C between the first lens 103a and the second lens 103b by a mechanism to change a distance between the first lens 103a and the second lens 103b; therefore a focal length of a lens system of the lenses 103a and 103b is changed, so that the magnification of a beam diameter of the laser light 105 is expanded or reduced. Besides, the third lens 103c is cooperated with the second lens 103b in order to make the laser light emitted from the second lens 103b parallel. Irradiation with the laser light through such a beam expander optical system having a zoom function enables the magnification of the laser light emitted to the irradiated surface to be easily changed. As the mechanism to change the distance between the first lens 103a and the second lens 103b, any well-known means for moving lenses can be use.

Since the size of the beam diameter of laser light generally has an individual difference by laser oscillators, it has been necessary to prepare a beam expander optical system for each laser oscillator in order to obtain laser of uniform size. However, the above-described zoom function is included in the beam expander optical system of the laser light irradiation apparatus described in this embodiment mode, so that laser light of any size can be obtained regardless of an individual difference of laser oscillators.

It is to be noted that a distance D between the second lens 103b and the third lens 103c are preferably disposed within 1 m.

The laser light irradiation apparatus or the laser light irradiation method described in this embodiment mode is more effective as the distance between the laser oscillator 101 and the beam expander optical system 103 is increased. Generally, in the case of disposing an optical system, it is necessary to provide the optical system with a certain distance in view of the apparatus. Accordingly, the laser light irradiation apparatus described in this embodiment mode is particularly effective when the distance between the laser oscillator 101 and the first lens 103a included in the beam expander optical system 103 is preferably greater than or equal to 0.5 m, more preferably greater than or equal to 1 m.

This embodiment mode can be applied to all laser light irradiation apparatuses and methods for laser light irradiation which use a beam expander optical system.

In the laser light irradiation apparatus described in this embodiment mode, a correction lens is provided between a laser oscillator and a beam expander optical system having a zoom function, so that positional shift of laser light at an irradiated surface can be reduced and an irradiation position of the laser light can be precisely controlled. Further, since the zoom function is included in the beam expander optical system, laser light of desired size can be obtained without replacing the beam expander optical system, when, for example, the laser oscillator is exchanged. Even when the size of laser light at an irradiated surface is intentionally changed, the laser light of any size can be easily obtained without exchanging the beam expander optical system.

Embodiment Mode 2

Embodiment Mode 2 will describe a laser light irradiation apparatus and a laser light irradiation method, which are different from those in the above-described embodiment mode, with reference to the drawing. Specifically, the case of using a beam expander optical system including a convex lens as a first lens will be described.

Figure 3:
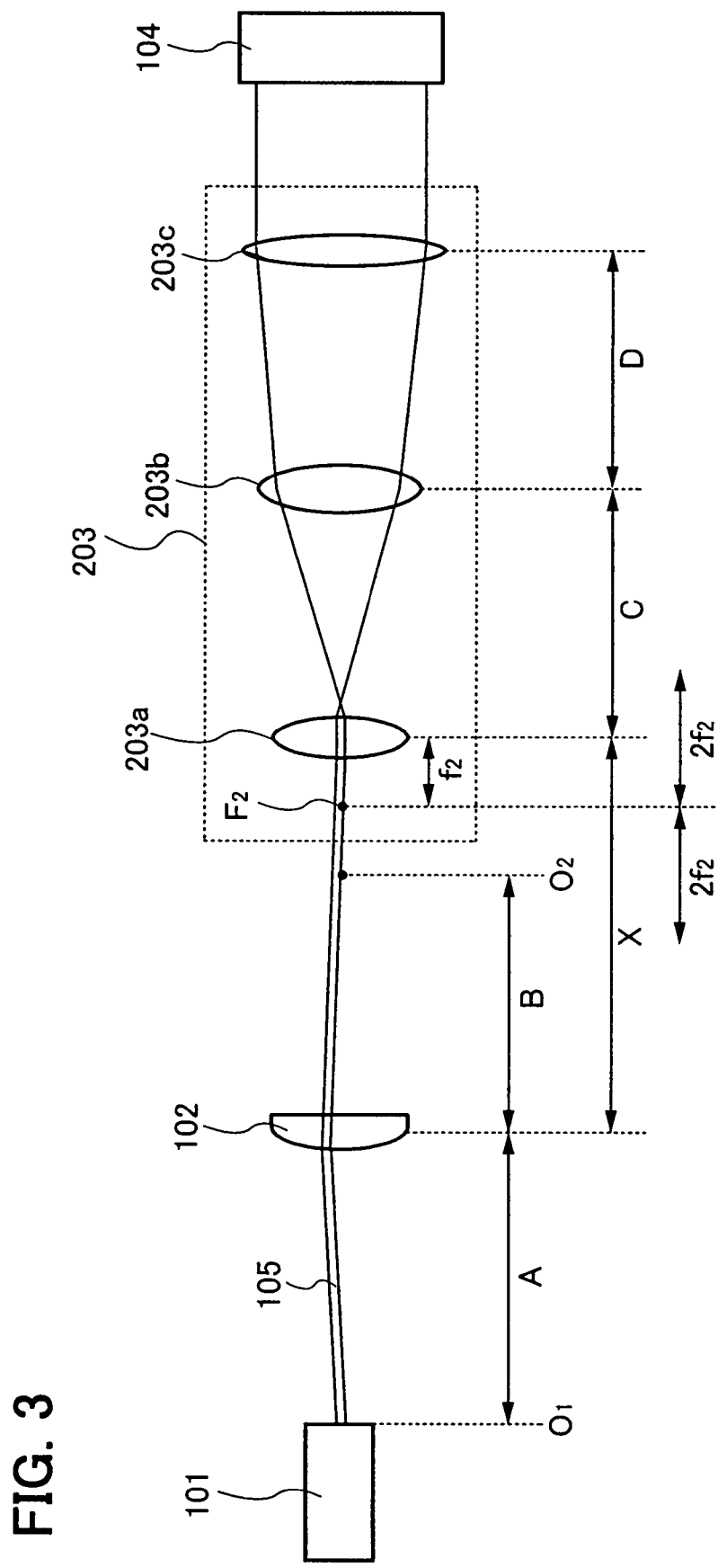
FIG. 3 illustrates an example of a laser light irradiation apparatus of the present invention.

One structural example of the laser light irradiation apparatus described in this embodiment mode is illustrated in FIG. 3. The laser irradiation apparatus illustrated in FIG. 3 includes at least a laser oscillator 101, a correction lens 102 which corrects an optical path, and a beam expander optical system 203 having a zoom function. Laser light 105 oscillated from the laser oscillator 101 is propagated to the beam expander optical system 103 through the correction lens 102 and passes through the beam expander optical system 203 to increase a scale thereof; therefore an irradiated object 104 is irradiated with the laser light 105 (see FIG. 3)

As the beam expander optical system 203, a first lens 203a and a second lens 203b, and a third lens 203c can be used in combination. In FIG. 3, the first lens 203a, the second lens 203b, and the third lens 203c are disposed in order in a traveling direction of the laser light 105 oscillated from the laser oscillator 101. Although an example of using biconvex lenses as the first lens 203a, the second lens 203b, and the third lens 203c is illustrated in FIG. 3, the lenses to be used are not limited to these. As the first lens 203a and the third lens 203c, any kind of convex lens can be used: for example, a convex lens such as a piano-convex lens or a convex meniscus lens, or an optical element having an equivalent function to that of the convex lens may be used. Besides, as the second lens 203b, any kind of spherical lens can be used: for example, a biconvex lens, a convex meniscus lens, a biconcave lens, a plano-concave lens, a concave meniscus lens, or the like may be used. Alternatively, a combination lens including two or more lenses may be used as each lens.

In addition, although an example of using a plano-convex lens as the correction lens 102 is illustrated in FIG. 3, a biconvex lens, a convex meniscus lens, or the like can be alternatively used. Alternatively, a cylindrical lens may also be used.

Even in the case where an incident angle of laser light which enters the beam expander optical system 203 is changed, if the laser light enters an optimal position at the beam expander optical system 203, the laser light is expanded and propagated from a certain position and angle to the next irradiated surface (here, the irradiated object 104). The correction lens 102 is disposed between the laser oscillator 101 and the beam expander optical system 203 in order to keep the incident position. Thus, by propagating the laser light oscillated from the laser oscillator 101 to the beam expander optical system 203 through the correction lens 102, the laser light of which an optical path is unstable can enter into a proper position at the beam expander optical system 203, and further, it becomes possible to propagate the laser light also to a proper position at a surface of the irradiated object 104. That is, the correction lens 102 is provided in order to control the incident position of the laser light which enters the first lens 203a included in the beam expander optical system 203.

The laser light having passed through the beam expander optical system 203 is propagated to the irradiated object 104. As the irradiated object 104, for example, a diffractive optical element can be used. Generally, reduction in a diameter of the diffractive optical element is extremely difficult at present, and a method in which laser light is expanded by a beam expander optical system or the like and propagated to the diffractive optical element is applied as a usage of the diffractive optical element. Accordingly, the correction lens 102 is provided between the laser oscillator 101 and the beam expander optical system 203 as described above, so that shift of the incident position of the laser light which enters the irradiated object 104 (for example, a diffractive optical element) can be reduced.

Further, in the laser light irradiation apparatus described in this embodiment mode, in the case where the laser light oscillated from the laser oscillator 101 enters the first lens 203a through the correction lens 102, when an emission point (or a beam waist or a light source) of the laser oscillator 101 is a first conjugate point $O_1$; a point at which an image at the first conjugate point $O_1$ is formed through the correction lens 102 is a second conjugate point $O_2$; a distance between the first conjugate point $O_1$ and the correction lens 102 is A; a distance between the correction lens 102 and the second conjugate point $O_2$ is B; a focal length of the first lens 203a is $f_2$; and a distance between the correction lens 102 and the first lens 203a is X, the first lens 203a is disposed so as to satisfy $B-f_2 \leq X \leq B+3f_2$.

The disposition satisfying the above numerical expression further satisfies the relation that the second conjugate point $O_2$ is located in the range of $2f_2$ in either the traveling direction of the laser light or the direction opposite to the traveling direction of the laser light from the focal point $F_2$ of the first lens 203a, when a focal point of the first lens 203a (here, a focal point of the first lens 203a located on the opposite side of the traveling direction side of the laser light) is $F_2$. The laser oscillator 101, the correction lens 102, the first lens 203a, and the like are disposed so that X satisfies such a relation; therefore incident errors of the laser light to the beam expander optical system can be reduced, and errors of the irradiation position of the laser light to the irradiated object 104 can be reduced.

It is to be noted that the first lens 203a may be preferably provided so that the distance X satisfies $X=B+f_2$. That is, the first lens 203a is provided so that the second conjugate point $O_2$ is formed to correspond to the focal point $F_2$ of the first lens 203a (here, the focal point of the first lens 203a located on the traveling direction side of the laser light). In this case, when an irradiated object 104 is irradiated with the laser light through the beam expander optical system 203, the errors of the irradiation position of the laser light to the irradiated object can be minimized.

In addition, when a focal length of the correction lens 102 is $f_1$, a distance between the first conjugate point $O_1$ and the correction lens 102 is A, and a distance between the correction lens 102 and the second conjugate point $O_2$ is B, the focal length $f_1$ of the correction lens 102 satisfies $1/A+1/B \approx 1/f_1$.

In the laser light irradiation apparatus described in this embodiment mode, the second lens 203b of the beam expander optical system 203 is provided to reduce or expand a spread angle of the laser light having passed through the first lens 203a. In addition, the third lens 203c is provided in order to make the laser light emitted from the second lens 203b parallel.

It is to be noted that, in the laser light irradiation apparatus described in this embodiment mode, the beam expander optical system 203 has a zoom function. Specifically, the second lens 203b of the beam expander optical system 203 is moved to change a distance C between the first lens 203a and the second lens 203b; therefore a focal length of a lens system of the lenses 203a and 203b is changed, so that the magnification of a beam diameter of the laser light 105 is expanded or reduced. Besides, the third lens 203c is cooperated with the second lens 203b in order to make the laser light emitted from the second lens 203b parallel.

Since the size of the beam diameter of laser light generally has an individual difference by laser oscillators, it has been necessary to prepare a beam expander optical system for each laser oscillator in order to obtain laser light of uniform size. However, the above-described zoom function is included in the beam expander optical system of the laser light irradiation apparatus described in this embodiment mode, so that laser light of any size can be obtained regardless of an individual difference of laser oscillators.

It is to be noted that a distance D between the second lens 203b and the third lens 203c are preferably disposed within 1 m.

The laser light irradiation apparatus or method for the laser light irradiation described in this embodiment mode is more effective as the distance between the laser oscillator 101 and the beam expander optical system 203 is increased. Generally, in the case of disposing an optical system, it is necessary to provide the optical system with a certain distance in view of the apparatus. Accordingly, the laser light irradiation apparatus described in this embodiment mode is particularly effective when the distance between the laser oscillator 101 and the first lens 203a included in the beam expander optical system 203 is preferably greater than or equal to 0.5 m, more preferably greater than or equal to 1 m.

This embodiment mode can be applied to all laser light irradiation apparatuses and methods for laser light irradiation which use a beam expander optical system.

Embodiment Mode 3

Embodiment Mode 3 will describe a method for manufacturing a semiconductor device which uses the laser light irradiation apparatus or the laser light irradiation method described in the above-described embodiment modes, with reference to the drawings.

Figure 6A:
FIGS. 6A to 6D illustrate an example of a method for manufacturing a semiconductor device, using a laser light irradiation apparatus of the present invention.

First, a peeling layer 702 is formed over a surface of a substrate 701, and sequentially, an insulating film 703 to be a base and an amorphous semiconductor film 704 (a film containing amorphous silicon, for example) are formed (see FIG. 6A). It is to be noted that the peeling layer 702, the insulating film 703, and the amorphous semiconductor film 704 can be formed sequentially.

As the substrate 701, a glass substrate, a quartz substrate, a metal substrate or stainless steel substrate with an insulating film formed on the surface, a plastic substrate having heat resistance against the treatment temperature of this step, or the like is preferably used. In the case of using such a substrate, an area and a shape thereof are not particularly restricted. Accordingly, using a rectangular substrate with at least one meter on a side as the substrate 701, for example, can drastically improve productivity. Such merit is greatly advantageous as compared to the case of using a circular silicon substrate. It is to be noted that, although the peeling layer 702 is formed on the entire surface of the substrate 701 in this step, the peeling layer 702 may be selectively formed as needed by a photolithography method after the peeling layer is formed on the entire surface of the substrate 701. In addition, the peeling layer 702 is formed so as to be in contact with the substrate 701; however, an insulating film may be formed as a base so as to be in contact with the substrate 701 as needed and the peeling layer 702 may be formed so as to be in contact with the insulating film.

As the peeling layer 702, a metal film, a stacked layer structure of a metal film and a metal oxide film, or the like can be used. The metal film is formed as a single layer or a stacked layer of a film formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rb), palladium (Pd), osmium (Os), and iridium (Ir), or an alloy material or a compound material containing the above-described element as its main component. Besides, the peeling layer 702 can be formed of these materials by a sputtering method, various CVD methods such as a plasma CVD method, or the like. As the stacked layer structure of a metal film and a metal oxide film, after the above-described metal film is formed, an oxide or oxynitride of the metal film can be formed on the metal film surface by plasma treatment in an oxygen atmosphere or an $N_2O$ atmosphere, or heat treatment in an oxygen atmosphere or an $N_2O$ atmosphere. For example, in the case where a tungsten film is formed by a sputtering method, a CVD method, or the like as the metal film, a metal oxide film comprising tungsten oxide can be formed on the tungsten film surface by plasma treatment on the tungsten film. When forming oxide of tungsten, oxidation number is not particularly limited, so that oxide of which the oxidation number is to be formed is preferably decided based on an etching rate or the like. Alternatively, for example, after a metal film (such as tungsten) is formed, an insulating film including silicon oxide or the like is formed over the metal film by a sputtering method, and metal oxide may be formed over the metal film (for example, tungsten oxide over tungsten). In addition, as plasma treatment, high-density plasma treatment may be performed, for example. In addition, other than the metal oxide film, metal nitride or metal oxynitride may be used. In this case, the metal film is preferably subjected to plasma treatment or heat treatment in a nitrogen atmosphere or an atmosphere of nitrogen and oxygen.

As the insulating film 703, a single layer or a stacked layer of a film containing oxide of silicon or nitride of silicon is formed by a sputtering method, a plasma CVD method, or the like. In the case where a two-layer structure is employed as the base insulating film, it is preferable that a silicon nitride oxide film be formed as a first layer and a silicon oxynitride film be formed as a second layer, for example. In the case where a three-layer structure is employed as the base insulating film, it is desirable that a silicon oxide film, a silicon nitride oxide film, and a silicon oxynitride film be formed as a first insulating film, a second insulating film, and a third insulating film, respectively. Alternatively, it is desirable to form a silicon oxynitride film as a first insulating film, a silicon nitride oxide film as a second insulating film, and a silicon oxynitride film as a third insulating film. The base insulating film functions as a blocking film for preventing entry of an impurity from the substrate 701.

The amorphous semiconductor film 704 is formed with a thickness of 25 to 200 nm (preferably 30 to 150 nm) by a sputtering method, an LPCVD method, a plasma CVD method, or the like.

Next, the amorphous semiconductor film 704 is crystallized by laser light irradiation. The amorphous semiconductor film 704 may be crystallized by a method in which a laser irradiation method is combined with a thermal crystallization method using an RTA or an annealing furnace or a thermal crystallization method using a metal element for promoting crystallization or the like. After that, the obtained crystalline semiconductor film is etched so as to have a desired shape, and crystalline semiconductor films 704a to 704d are formed.

Figure 6B:
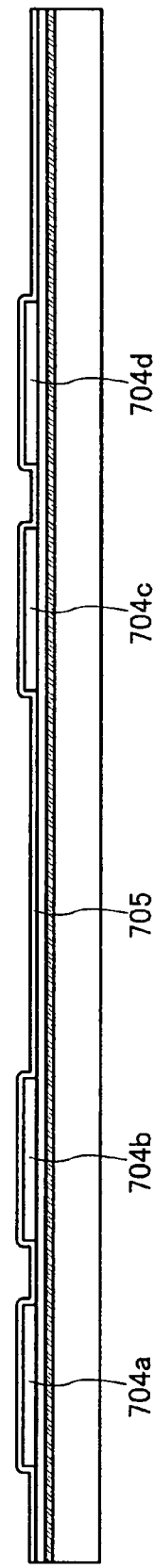

Then, a gate insulating film 705 is formed so as to cover the crystalline semiconductor films 704a to 704d (see FIG. 6B).

An example of a manufacturing step of the crystalline semiconductor films 704a to 704d will be briefly described below. First, an amorphous semiconductor film with a thickness of 50 to 60 nm is formed by a plasma CVD method. Next, a solution containing nickel that is a metal element for promoting crystallization is retained on the amorphous semiconductor film, and dehydrogenation treatment (at 500° C., for one hour) and thermal crystallization treatment (at 550° C., for four hours) are performed on the amorphous semiconductor film; therefore a crystalline semiconductor film is formed. After that, the crystalline semiconductor film is irradiated with laser light and a photolithography method is used, so that the crystalline semiconductor films 704a to 704d are formed. It is to be noted that without conducting the thermal crystallization which uses the metal element for promoting crystallization, the amorphous semiconductor film may be crystallized only by laser light irradiation.

Here, an example of a laser light irradiation apparatus and a laser light irradiation method used in laser light irradiation will be described (see FIG. 4). The laser light irradiation apparatus illustrated in FIG. 4 includes a laser oscillator 901, a correction lens 902, a beam expander optical system 903 including a first lens 903a, second lens 903b, and a third lens 903c, a diffractive optical element 904, a mirror 905, a suction stage 908, an X stage 909, and a Y stage 910.

First, a substrate 701 on which an amorphous semiconductor film 704 is formed is prepared. The substrate 701 is fixed on the suction stage 908. The suction stage 908 can be moved freely in an X-axis direction and a Y-axis direction with the use of the X stage 909 and the Y stage 910. It is to be noted that various stages such as a motor stage, a ball bearing stage, and a linear motor stage can be used for the movement in the X-axis direction and the Y-axis direction.

Laser light oscillated from the laser oscillator 901 enters the beam expander optical system 903 through the correction lens 902, and then a scale of the laser light is expanded by the beam expander optical system 903. After the laser light passes through the diffractive optical element 904, the amorphous semiconductor film 704 provided over the substrate 701 is irradiated with the laser light.

As the laser oscillator 901, a continuous wave laser oscillator (CW laser oscillator) or a pulsed wave laser oscillator pulsed laser oscillator) can be used. As a laser beam which can be used here, a laser beam emitted from one or more of the following can be used: a gas laser such as an Ar laser, a Kr laser, or an excimer laser; a laser of which the medium is single crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$, each added with one or more of Nd, Yb, Cr, Ti, Ho, Er, Tm and Ta as a dopant; a glass laser; a ruby laser; an alexandrite laser; a Ti:sapphire laser; a copper vapor laser; or a gold vapor laser. It is possible to obtain crystals with large grain size when fundamental waves of such laser beams or second to fourth harmonics of the fundamental waves are emitted. For example, the second harmonic (532 nm) or the third harmonic (355 nm) of an Nd: $YVO_4$ laser (fundamental wave of 1064 nm) can be used. In this case, an energy density of about 0.01 to 100 $MW/cm^2$ (preferably, 0.1 to 10 $MW/cm^2$) is required and the scanning rate is set to about 10 to 2000 cm/sec. It is to be noted that, a laser using, as a medium, single crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$ added with one or more of Nd, Yb, Cr, X, Ho, Er, Tm, and Ta as a dopant; an Ar ion laser; or a Ti:sapphire laser can be continuously oscillated.

Furthermore, pulse oscillation thereof can be performed at a repetition rate of greater than or equal to 10 MHz with Q switch operation, mode locking, or the like. When a laser beam is oscillated at a repetition rate of greater than or equal to 10 MHz, the semiconductor film is irradiated with the next pulse during the period in which a semiconductor film is melted by the laser and solidified. Accordingly, unlike the case of using a pulsed laser at a low repetition rate, a solid-liquid interface can be continuously moved in the semiconductor film, so that crystal grains which continuously grow in a scanning direction can be obtained.

The laser oscillator 901, the correction lens 902, and the first lens 903a are disposed so as to satisfy the relation described in Embodiment Mode 1. By providing the correction lens 902 between the laser oscillator 901 and the first lens 903a in this manner, positional shift of the laser light which enters the substrate 701 through the diffractive optical element 904 after passing through the beam expander optical system 903 can be reduced, and the irradiation position of the laser light can be precisely controlled.

The first lens 903a, the second lens 903b, and the third lens 903c of the beam expander optical system 903 are disposed so as to satisfy the relation described in Embodiment Mode 1. In this manner, the second lens 903b and the third lens 903c are moved in accordance with the beam diameter of the laser light emitted from the laser oscillator, so that laser light of any size can be obtained regardless of an individual difference by laser oscillators used as the laser oscillator 901.

As typical examples of the diffractive optical element 904, a holographic optical element, a binary optical element, and the like are given. The diffractive optical element 904 is also referred to as diffractive optics or a diffractive optics element, which is an element for obtaining a spectrum with the utilization of light diffraction. As the diffractive optical element 904, a diffractive optical element having a condenser lens function due to a plurality of grooves formed on its surface is used. Then, with the use of the diffractive optical element 904, the laser light oscillated from the laser oscillator can be formed into a linear or rectangular laser light with homogeneous energy distribution.

Figure 4:
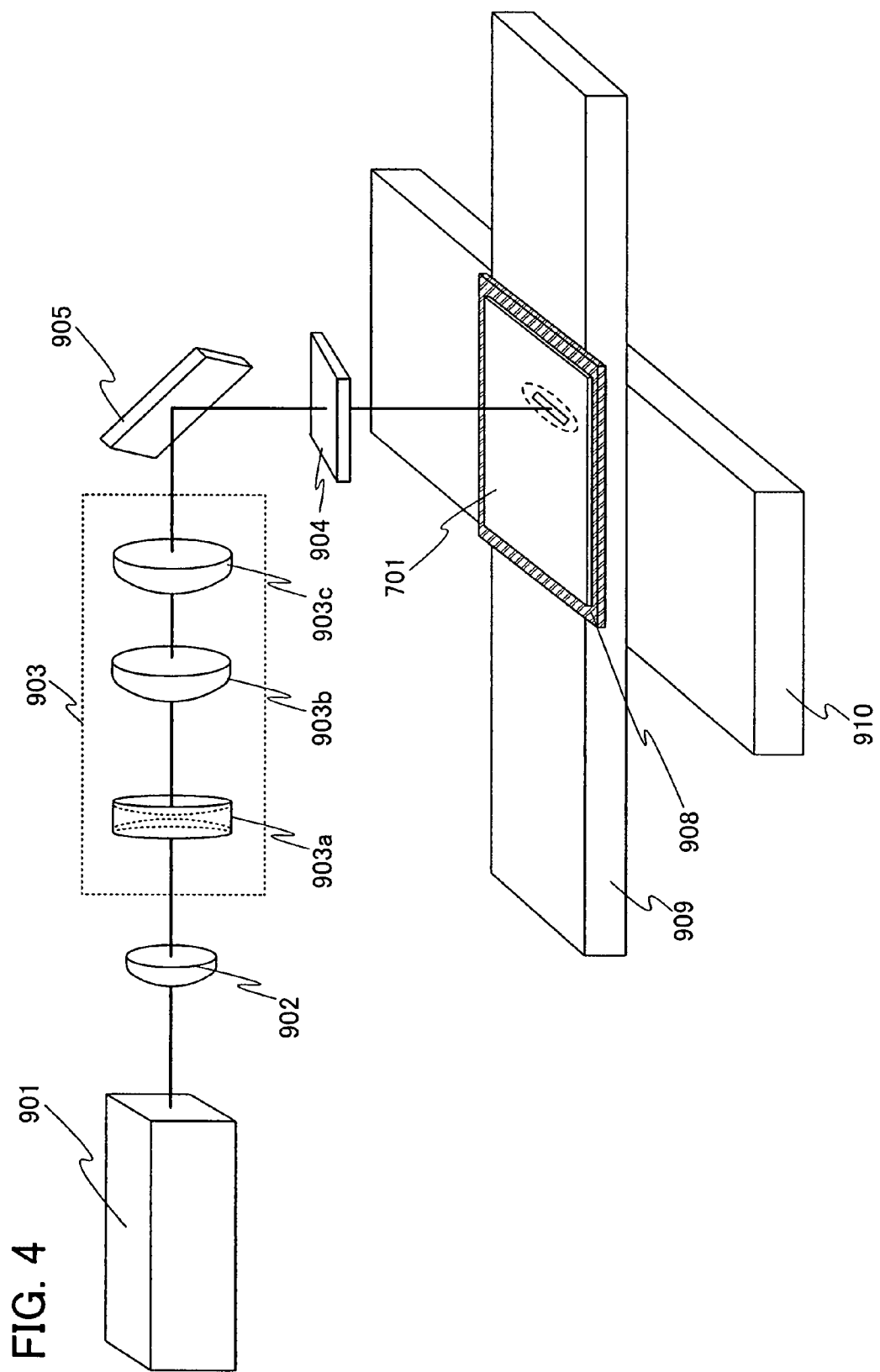
FIG. 4 illustrates an example of a laser light irradiation apparatus of the present invention.
Figure 5:
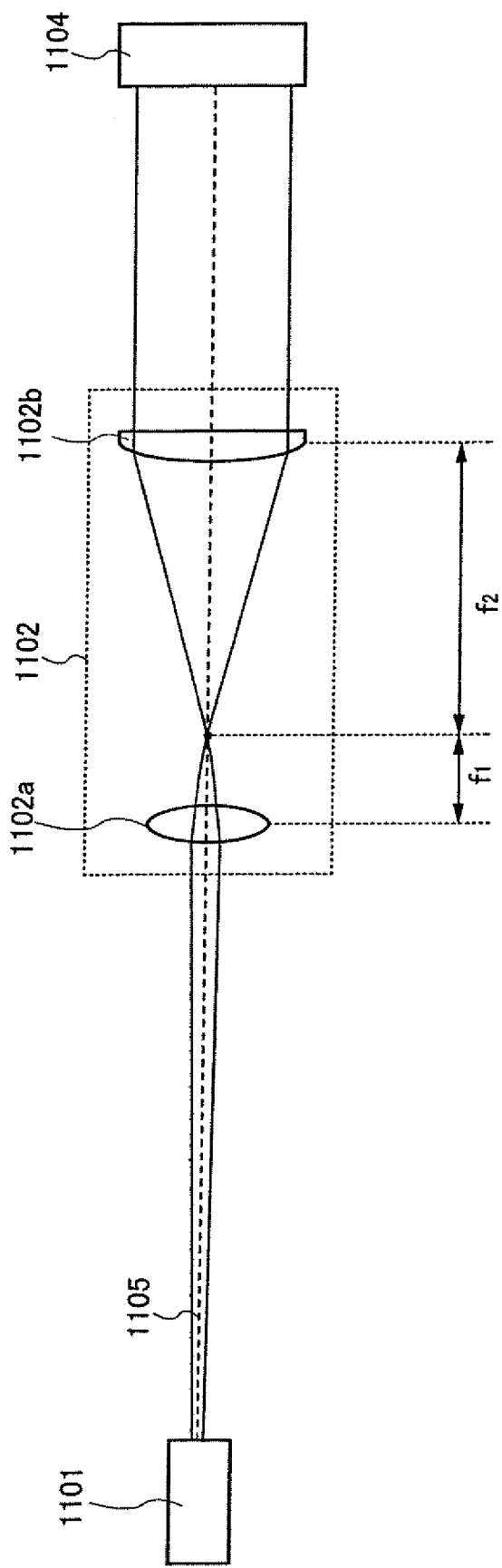
FIG. 5 illustrates an example of a conventional laser light irradiation apparatus.

The laser light irradiation apparatus that can be used in this embodiment mode is not limited to the structure illustrated in FIG. 4. Although an example that a concave lens is used as the first lens 903a for forming the beam expander optical system 903 is illustrated in FIG. 4, a convex lens, for example, may be substituted for the concave lens. In this case, the laser oscillator 901, the correction lens 902, and the convex lens substituted for the first lens 903a are disposed so as to satisfy the relation described in Embodiment Mode 2. Besides, an example that a convex lens is used as the second lens 903b is illustrated in FIG. 4, a concave lens, for example, may be substituted for the convex lens.

A condensing lens may be provided on an irradiated surface side or a laser side of the diffractive optical element 904. For example, two cylindrical lenses can be used. In this case, laser light is made to perpendicularly enter the two cylindrical lenses. Since a cylindrical lens has a curvature in one direction, it is possible to condense or diffuse laser light only in a one-dimensional direction. Accordingly, size of a beam spot at an irradiated surface can be optionally changed in X and Y directions with the curvature direction of the two cylindrical lenses each in an X-axis direction and in a Y-axis direction, so that optical adjustment is easy and freedom of the adjustment is high. Alternatively, laser light may be condensed or diffused only in one direction using one cylindrical lens. Further, in the case where laser light is condensed with the length ratio of a major axis and a minor axis of an image which is formed with the diffractive optical element 904 kept, a spherical lens may be used instead of the cylindrical lens.

It is to be noted that in the laser light irradiation apparatus illustrated in FIG. 4, a distance between the laser oscillator 901 and the first lens 903a is preferably greater than or equal to 0.5 m, and more preferably, greater than or equal to 1 m in view of the apparatus. In addition, the second lens 903b and the third lens 903c are preferably disposed so that a distance therebetween is within 1 m.

In this manner, the amorphous semiconductor film 704 can be crystallized uniformly by the above-described laser light irradiation method.

Next, an example of manufacturing step of the gate insulating film 705 (as shown in FIG. 6B) for covering the crystalline semiconductor films 704a to 704d will be described below. As the gate insulating film 705, a single layer or a stacked layer of a film containing oxide of silicon or nitride of silicon is formed by a CVD method, a sputtering method, or the like. Specifically, a film containing silicon oxide, a film containing silicon oxynitride, or a film containing silicon nitride oxide is formed as a single layer or a stacked layer.

Alternatively, the gate insulating film 705 may be formed by high-density plasma treatment on the crystalline semiconductor films 704a to 704d to oxidize or nitride the surfaces. For example, the film is formed by plasma treatment in which a mixed gas of a rare gas such as He, Ar, Kr, or Xe and oxygen, nitrogen oxide ($NO_2$), ammonia, nitrogen, hydrogen, or the like is introduced. In this case, plasma is excited by introduction of a microwave, so that the plasma with a low electron temperature and a high density can be generated. An oxygen radical (which may include an OH radical) or a nitrogen radical (which may include an NH radical) generated by this high-density plasma enables oxidation or nitridation of a semiconductor film surface.

By the treatment using such high-density plasma, an insulating film with a thickness of 1 to 20 nm, typically 5 to 10 nm, is formed over a semiconductor film. Since the reaction in this case is a solid-phase reaction, the interface state density between the insulating film and the semiconductor film can be extremely low. Since a semiconductor film (crystalline silicon or polycrystalline silicon) is directly oxidized (or nitrided) by such high-density plasma treatment, unevenness of a thickness of the insulating film to be formed can be extremely small, ideally. In addition, oxidation is not strengthened even in a crystal grain boundary of crystalline silicon, which makes an extremely preferable condition. That is, when the semiconductor film surface is subjected to solid-phase oxidation by the high-density plasma treatment described here, an insulating film with good uniformity and a low interface state density can be formed without causing an excessive oxidation reaction in a crystal grain boundary.

As the gate insulating film, an insulating film formed by high-density plasma treatment may be used by itself, or an insulating film comprising silicon oxide, silicon oxynitride, silicon nitride, or the like may be formed by a CVD method using plasma or a thermal reaction and stacked thereover. In any case, when a transistor is formed to include an insulating film formed by high-density plasma in a part of the gate insulating film or in the whole gate insulating film, characteristic variations can be reduced.

Further, the crystalline semiconductor films 704a to 704d each obtained in such a manner that a semiconductor film is scanned in one direction for crystallization and irradiated with a continuous wave laser beam or a laser beam oscillated at a repetition rate of greater than or equal to 10 MHz have a characteristic that a crystal grows in the scanning direction of the beam. When a transistor is disposed so that the scanning direction is aligned with a channel length direction (direction in which carriers flow when a channel formation region is formed) and the above-described gate insulating layer is combined a thin film transistor (TFT) with fewer characteristic variations and high electron field-effect mobility can be obtained.

Next, a first conductive film and a second conductive film are stacked over the gate insulating film 705. Here, the first conductive film is formed with a thickness of 20 to 100 nm by a plasma CVD method, a sputtering method, or the like, and the second conductive film is formed with a thickness of 100 to 400 nm. The first conductive film and the second conductive film are formed using an element selected from tantalum (Ta), tungsten (W), titanium (Ti), molybdenum (Mo), aluminum (Al), copper (Cu), chromium (Cr), niobium (Nb), and the like, or an alloy material or a compound material containing the above-described element as its main component. Alternatively, they are formed using a semiconductor material typified by polycrystalline silicon doped with an impurity element such as phosphorus. As examples of a combination of the first conductive film and the second conductive film, a tantalum nitride film and a tungsten film; a tungsten nitride film and a tungsten film; a molybdenum nitride film and a molybdenum film, and the like can be given. Since tungsten and tantalum nitride have high heat resistance, heat treatment for the purpose of thermal activation can be performed thereon after the first conductive film and the second conductive film are formed. Alternatively, in the case of a three-layer structure instead of a two-layer structure, a stacked layer structure of a molybdenum film, an aluminum film, and a molybdenum film is preferably employed.

Next, a resist mask is formed by a photolithography method, and etching treatment for forming a gate electrode and a gate line is performed, so that gate electrodes 707 are formed above the crystalline semiconductor films 704a to 704d.

Next, a resist mask is formed by a photolithography method, and an impurity element imparting n-type conductivity is added at a low concentration to the crystalline semiconductor films 704a to 704d, by an ion doping method or an ion implantation method. As the impurity element imparting n-type conductivity, an element which belongs to Group 15 may be used: for example, phosphorus (P) or arsenic (As) is used.

Next, an insulating film is formed so as to cover the gate insulating film 705 and the gate electrodes 707. The insulating film is formed as a single layer or a stacked layer of a film containing an inorganic material such as silicon, oxide of silicon, or nitride of silicon, or an organic material such as an organic resin, by a plasma CVD method, a sputtering method, or the like. Next, the insulating film is selectively etched by anisotropic etching which mainly etches in a perpendicular direction, so that insulating films 708 (also referred to as side walls) which are in contact with side surfaces of the gate electrodes 707 are formed. The insulating films 708 are used as masks for doping when LDD (Lightly Doped drain) regions are formed later.

Figure 6C:
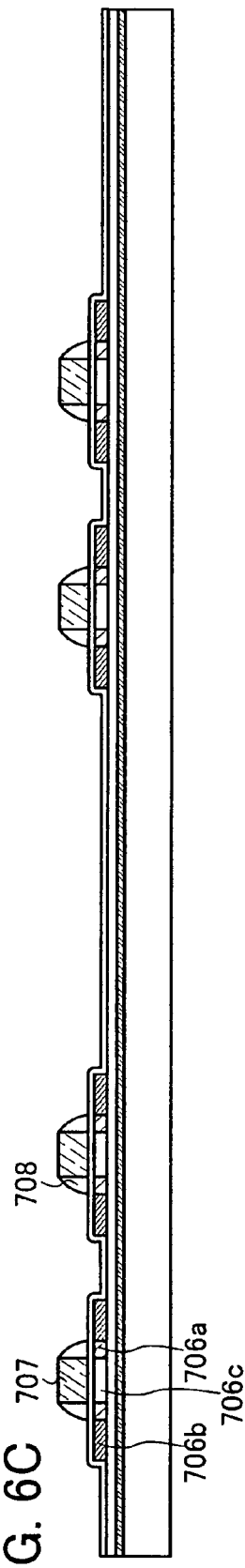

Next, using a resist mask formed by a photolithography method, and the gate electrodes 707 and the insulating films 708 as masks, an impurity element imparting n-type conductivity is added to the crystalline semiconductor films 704a to 704d, so that first n-type impurity regions 706a (also referred to as LDD regions), second n-type impurity regions 706b, and channel regions 706c are formed (see FIG. 6C). The concentration of the impurity element contained in the first n-type impurity regions 706a is lower than the concentration of the impurity element contained in the second n-type impurity regions 706b.

Figure 6D:
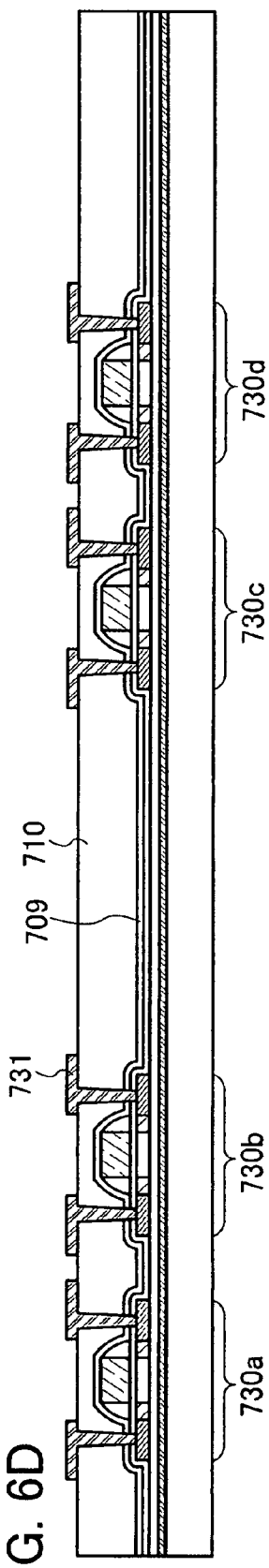

Next, an insulating film is formed as a single layer or a stacked layer so as to cover the gate electrodes 707, the insulating films 708, and the like so as to form thin film transistors 730a to 730d (see FIG. 6D). The insulating film is formed as a single layer or a stacked layer using an inorganic material such as oxide of silicon or nitride of silicon; an organic material such as polyimide, polyamide, benzocyclobutene, acrylic, or epoxy; a siloxane material; or the like, by a CVD method, a sputtering method, an SOG method, a droplet discharge method, a screen printing method, or the like. For example, in the case where the insulating film has a two-layer structure, a silicon nitride oxide film can be formed as a first insulating film 709 and a silicon oxynitride film can be formed as a second insulating film 710.

It is to be noted that before the insulating films 709 and 710 are formed or after one or both of thin films of the insulating films 709 and 710 are formed, heat treatment is preferably performed for recovering the crystallinity of the semiconductor film, for activating the impurity element which has been added into the semiconductor film, or for hydrogenating the semiconductor film. For the heat treatment, thermal annealing, a laser annealing method, an RTA method, or the like is preferably employed.

Next, the insulating films 709 and 710, and the like are etched by a photolithography method, so that contact holes are formed to expose the second n-type impurity regions 706b. Then, a conductive film is formed so as to fill the contact holes and the conductive film is selectively etched so as to form conductive films 731. It is to be noted that before forming the conductive film, silicide may be formed on surfaces of the crystalline semiconductor films 704a to 704d exposed at the contact holes.

A conductive film 731 is formed as a single layer or a stacked layer of element selected from aluminum, tungsten, titanium, tantalum, molybdenum, nickel, platinum, copper, gold, silver, manganese, neodymium, carbon, and silicon, or an alloy material or a compound material containing the above-described element as its main component by a CVD method, a sputtering method, or the like. An alloy material containing aluminum as its main component corresponds to, for example, a material containing aluminum as its main component and nickel; or an alloy material containing aluminum as its main component, nickel, and one or both of carbon and silicon. As a conductive film 731, for example, a stacked layer structure of a barrier film, an aluminum-silicon film, and a barrier film; or a stacked layer structure of a barrier film, an aluminum-silicon film, a titanium nitride film, and a barrier film is preferably employed. It is to be noted that a barrier film corresponds to a thin film formed of titanium, a nitride of titanium, molybdenum, or a nitride of molybdenum. Aluminum or aluminum silicon, which has a low resistance value and is inexpensive, is an optimal material for forming the conductive film 731. Further, when barrier layers are provided as an upper layer and a bottom layer, generation of hillock of aluminum or aluminum silicon can be prevented. Moreover, even if a thin natural oxide film is formed over a crystalline semiconductor layer, this natural oxide film is reduced with a barrier layer formed of titanium having a high reducing property, so that favorable contact with the crystalline semiconductor layer can be obtained.

Next, an insulating film 711 is formed so as to cover the conductive films 731, and conductive films 712 are formed over the insulating film 711 so as to be electrically connected to the conductive films 731 (see FIG. 7A). The insulating film 711 is formed as a single layer or a stacked layer using an inorganic material or an organic material by a CVD method, a sputtering method, an SOG method, a droplet discharge method, a screen printing method, or the like. The insulating film 711 is preferably formed with a thickness of 0.75 to 3 μm. Furthermore, the conductive films 712 can be formed using any of the above materials of which the conductive films 731 can be formed.

Next, conductive films 713 are formed over the conductive films 712. The conductive films 713 are formed using a conductive material, by a CVD method, a sputtering method, a droplet discharge method, a screen printing method, or the like (see FIG. 7B). Preferably, the conductive films 713 are formed as a single layer or a stacked layer using an element selected from aluminum (Al), titanium (Ti), silver (Ag), copper (Cu), and gold (Au), or an alloy material or a compound material containing the above-described element as its main component. Here, a paste containing silver is formed over the conductive films 712 by a screen printing method, and then subjected to heat treatment at 50 to 350° C. to form the conductive films 713. In addition, after the conductive films 713 are formed over the conductive films 712, regions where the conductive films 713 and the conductive films 712 overlap each other may be irradiated with laser light so as to improve electrical connection thereof. It is to be noted that the conductive films 713 can be selectively formed over the conductive films 731 without forming the insulating film 711 and the conductive films 712.

Next, an insulating film 714 is formed so as to cover the conductive films 712 and 713, and selectively etched by a photolithography method, so that opening portions 715 where the conductive films 713 (see FIG. 7C) is exposed are formed. The insulating film 714 is formed as a single layer or a stacked layer using an inorganic material or an organic material, by a CVD method, a sputtering method, an SOG method, a droplet discharge method, a screen printing method, or the like.

Next, layers 732 including the thin film transistors 730a to 730d and the like (hereinafter also referred to as "layers 732") are peeled from the substrate 701. Here, after opening portions 716 are formed by laser light (such as UV light) irradiation (see FIG. 8A), the layers 732 can be peeled from the substrate 701 by physical force. Alternatively, before the layers 732 are peeling from the substrate 701, an etchant may be introduced into the opening portions 716 and the peeling layer 702 is removed. As the etchant, a gas or a liquid containing halogen fluoride or an interhalogen compound is used: for example, chlorine trifluoride ($ClF_3$) is used as a gas containing halogen fluoride. Thus, the layers 732 are peeled from the substrate 701. It is to be noted that the peeling layer 702 may be partially left instead of being removed entirely, so that consumption of the etchant can be reduced and process time for removing the peeling layer can be shortened. In addition, the layers 732 can be retained over the substrate 701 even after the peeling layer 702 is removed. Further, in order to reduce the cost, it is preferable to reuse the substrate 701 after the layers 732 are peeled off.

Here, after the opening portions 716 are formed by etching of the insulating film by laser light irradiation, a surface of the layers 732 (a surface where the insulating film 714 is exposed) is attached to a first sheet material 717 and the layers 732 are peeled completely from the substrate 701 (see FIG. 8B). As the first sheet material 717, a thermal peeling tape of which adhesiveness is lowered by heat can be used, for example.

Figure 9A:
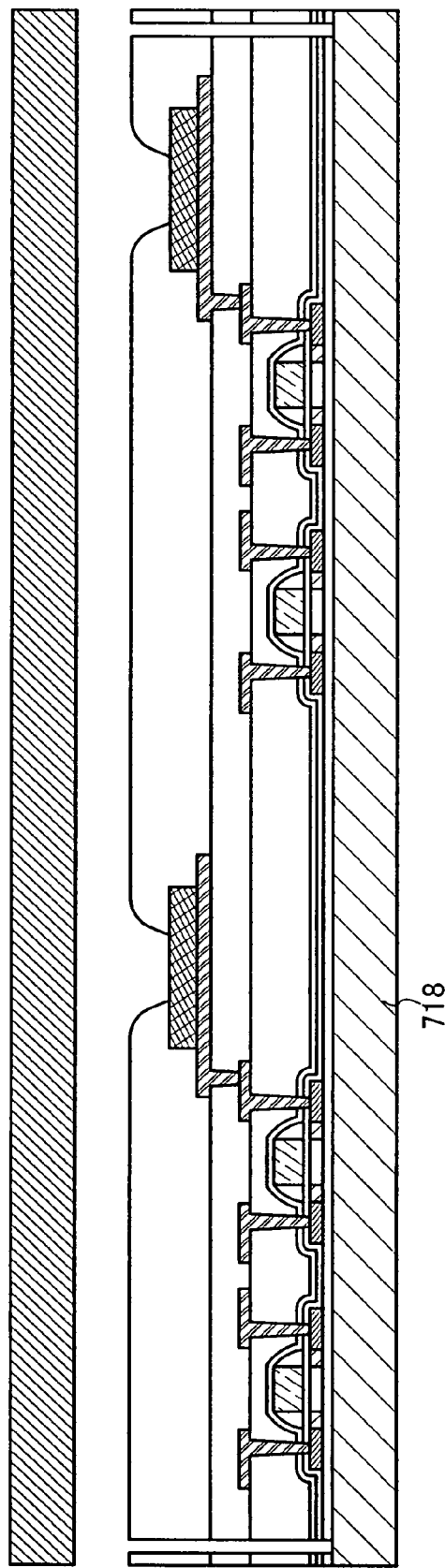
FIGS. 9A and 9B illustrate an example of a method for manufacturing a semiconductor device, using a laser light irradiation apparatus of the present invention.

Next, a second sheet material 718 is provided on the other surface (the surface peeled from the substrate 701) of the layers 732, and then subjected to one or both of heat treatment and pressure treatment, so that the second sheet material 718 is attached. Concurrently with or after providing the second sheet material 718, the first sheet material 717 is peeled off (see FIG. 9A). As the second sheet material 718, a hot-melt film or the like can be used. In the case where a thermal peeling tape is used as the first sheet material 717, heat applied for attaching the second sheet material 718 can be utilized for peeling.

As the second sheet material 718, a film on which antistatic treatment for preventing static electricity or the like is performed (hereinafter referred to as an antistatic film) can also be used. As the antistatic film, a film with an antistatic material dispersed in a resin, a film with an antistatic material attached thereon, and the like can be given as examples. The film provided with an antistatic material may be a film with an antistatic material provided on one of its surfaces, or a film with an antistatic material provided on both of its surfaces. As for the film with the antistatic material provided on one of its surfaces, the film may be attached to the layer so that the antistatic material is placed on the inner side of the film or the outer side of the film. It is to be noted that the antistatic material is preferably provided on the entire surface of the film, or on a part of the film. As the antistatic material here, a metal, an indium tin oxide (ITO), or a surfactant such as an amphoteric surfactant, a cationic surfactant, or a nonionic surfactant can be used. Alternatively, a resin material containing cross-linkable copolymer having a carboxyl group and a quaternary ammonium base on its side chain, or the like can be used as the antistatic material. The antistatic film can be formed by attaching, mixing, or applying such a material to a film. By providing the antistatic film, adverse effects on a semiconductor element due to static electricity or the like from outside can be suppressed when a semiconductor device is dealt with as a commercial product.

Figure 9B:
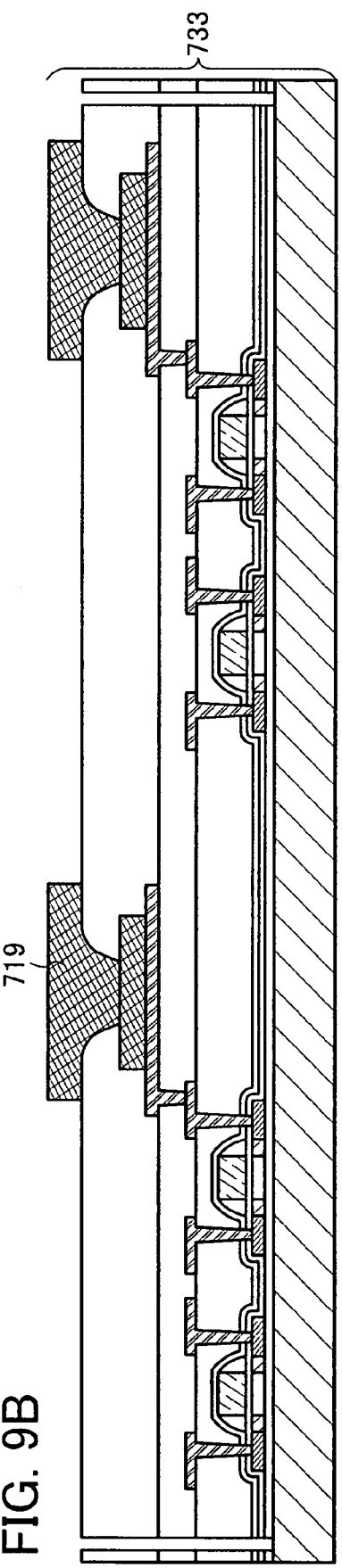

Next, conductive films 719 are formed so as to cover the opening portions 715 and an element group 733 is formed (see FIG. 9B). It is to be noted that, before or after the formation of the conductive films 719, the conductive films 712 and 713 may be irradiated with laser light so as to improve electrical connection thereof.

Next, the element group 733 is selectively irradiated with laser light so as to be divided into a plurality of element groups (see FIG. 10A).

Next, the element group 733 is pressure-bonded to a substrate 721 over which a conductive film 722 functioning as an antenna is formed (see FIG. 10B). Specifically, the element group 733 is attached to the substrate 721 so that the conductive film 722 functioning as an antenna formed over the substrate 721 and the conductive film 719 of the element group 733 are electrically connected to each other. Here, the substrate 721 and the element group 733 are bonded to each other with the use of a resin 723 having adhesiveness. In addition, the conductive film 722 and the conductive film 719 are electrically connected to each other with the use of conductive particles 724 contained in the resin 723.

It is to be noted that this embodiment mode can be freely combined with the above embodiment modes. In other words, the material or the formation method described in the above embodiment modes can be used in combination also in this embodiment mode, and the material or the formation method described in this embodiment mode can be used in combination also in the above embodiment modes.

Embodiment Mode 4

Embodiment Mode 4 describes an example of usage modes of a semiconductor device which is obtained by the manufacturing method described in the above-described Embodiment Mode 3. Specifically, applications of a semiconductor device which can input and output data without contact will be described below with reference to the drawings. The semiconductor device which can input and output data without contact is also referred to as an RFID tag, an ID tag, an IC tag, an IC chip, an RF tag, a wireless tag, an electronic tag, or a wireless chip depending on application modes.

Figure 11A:
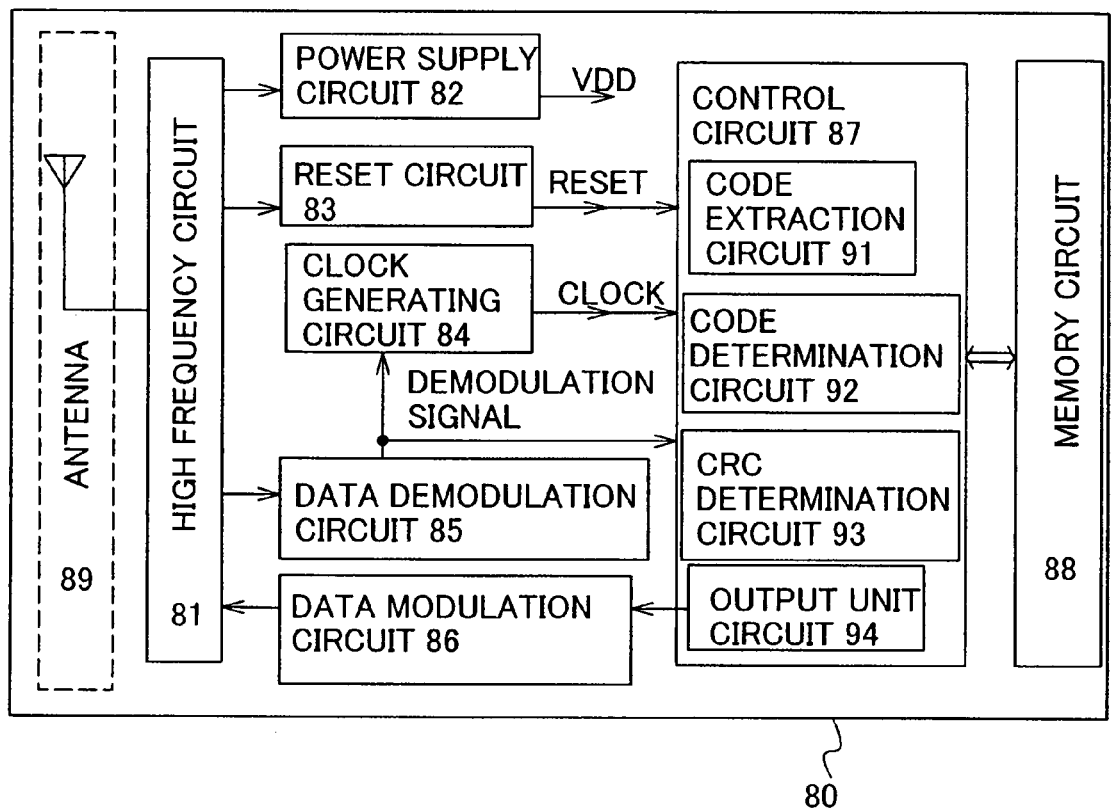
FIGS. 11A to 11C illustrate examples of usage modes of a semiconductor device manufactured using a laser irradiation apparatus of the present invention.

A semiconductor device 80 has a function of communicating data without contact and includes a high frequency circuit 81, a power supply circuit 82, a reset circuit 83, a clock generation circuit 84, a data demodulation circuit 85, a data modulation circuit 86, a control circuit 87 for controlling other circuits, a memory circuit 88, and an antenna 89 (see FIG. 11A). The high frequency circuit 81 is a circuit which receives a signal from the antenna 89 and makes the antenna 89 output a signal received from the data modulation circuit 86. The power supply circuit 82 is a circuit which generates a power supply potential from the received signal. The reset circuit 83 is a circuit which generates a reset signal. The clock generation circuit 84 is a circuit which generates various clock signals based on the received signal input from the antenna 89. The data demodulation circuit 85 is a circuit which demodulates the received signal and outputs the signal to the control circuit 87. The data modulation circuit 86 is a circuit which modulates a signal received from the control circuit 87. Also, the control circuit 87 includes a code extraction circuit 91, a code determination circuit 92, a CRC determination circuit 93, and an output unit circuit 94, for example. The code extraction circuit 91 is a circuit which separately extracts a plurality of codes included in an instruction transmitted to the control circuit 87. The code determination circuit 92 is a circuit which compares the extracted code and a code corresponding to a reference to determine the content of the instruction. The CRC determination circuit 93 is a circuit which detects the presence or absence of a transmission error or the like based on the determined code.

Next, an example of operation of the above-described semiconductor device will be explained. First, a radio signal is received by the antenna 89. The radio signal is transmitted to the power supply circuit 82 via the high frequency circuit 81, and a high power supply potential (hereinafter referred to as VDD) is generated. The VDD is supplied to each circuit included in the semiconductor device 80. In addition, a signal transmitted to the data demodulation circuit 85 via the high frequency circuit 81 is demodulated (hereinafter, a demodulated signal). Furthermore, signals transmitted through the reset circuit 83 and the clock generation circuit 84 via the high frequency circuit 81 and the demodulated signal are transmitted to the control circuit 87. The signal transmitted to the control circuit 87 is analyzed by the code extraction circuit 91, the code determination circuit 92, the CRC determination circuit 93, and the like. Then, in accordance with the analyzed signal, information of the semiconductor device stored in the memory circuit 88 is output. The output information of the semiconductor device is encoded through the output unit circuit 94. Furthermore, the encoded information of the semiconductor device 80 is, through the data modulation circuit 86, transmitted by the antenna 89 as a radio signal. It is to be noted that a low power supply potential (hereinafter, VSS) is common among a plurality of circuits included in the semiconductor device 80, and VSS can be set to GND.

Thus, data of the semiconductor device can be read by transmitting a signal from a reader/writer to the semiconductor device 80 and receiving the signal transmitted from the semiconductor device 80 by the reader/writer.

In addition, the semiconductor device 80 may supply a power supply voltage to each circuit by an electromagnetic wave without a power source (battery) mounted, or by an electromagnetic wave and a power source battery) with the power source (battery) mounted.

Since a semiconductor device which can be bent can be manufactured by using the manufacturing method described in the above embodiment mode, the semiconductor device can be attached to an object having a curved surface.

Figure 11B:
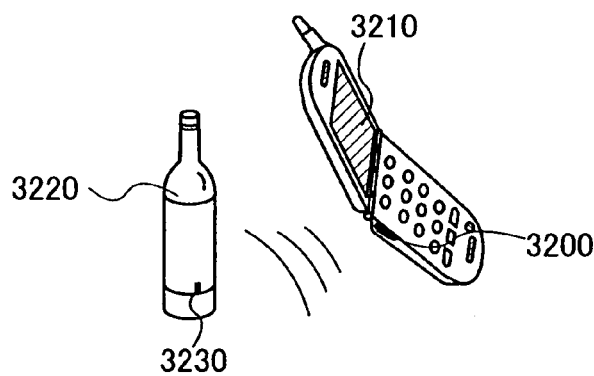
Figure 11C:
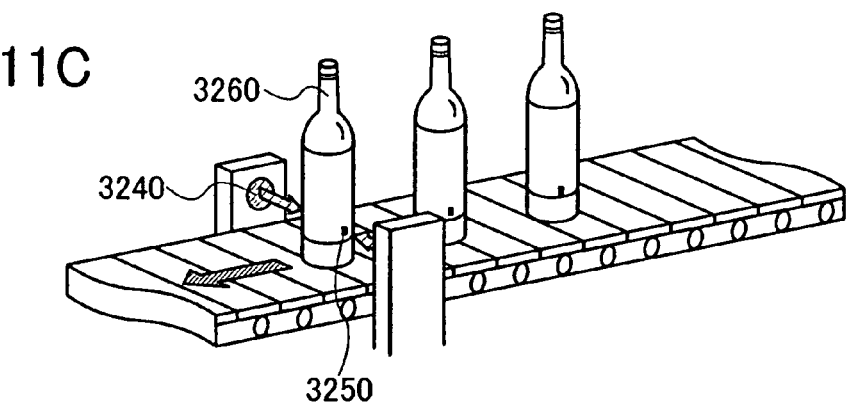
Figure 12A:
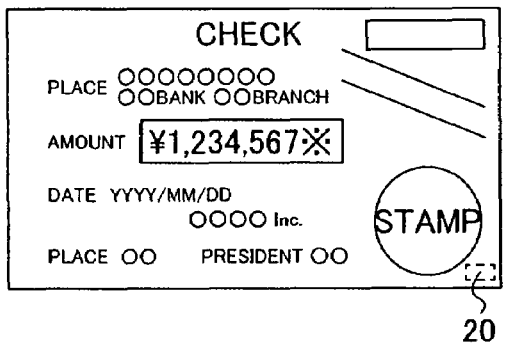
FIGS. 12A to 12H illustrate examples of usage modes of a semiconductor device manufactured using a laser irradiation apparatus of the present invention.
Figure 12B:
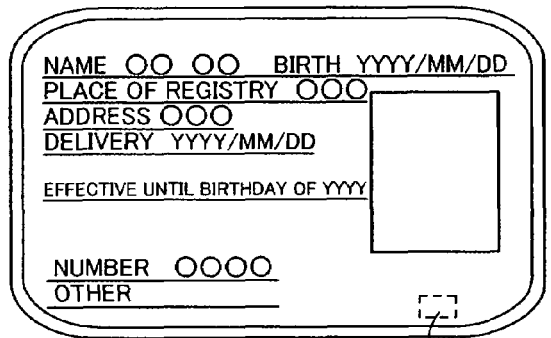
Figure 12C:
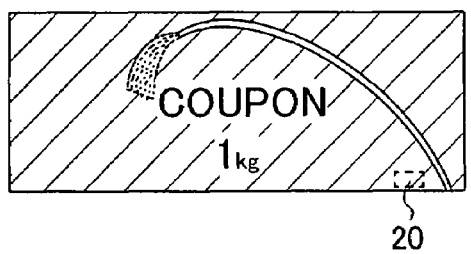
Figure 12D:
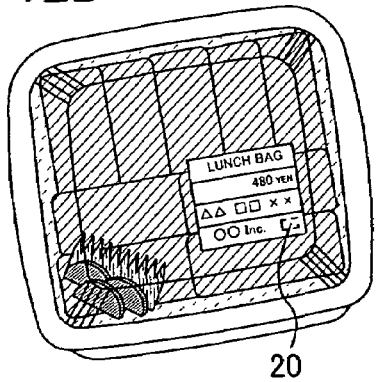
Figure 12E:
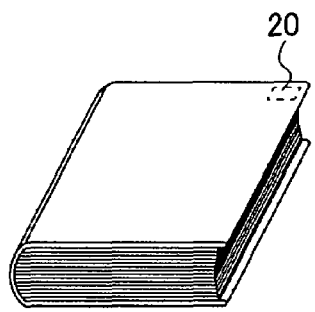
Figure 12F:
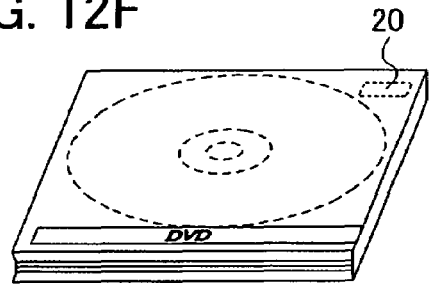
Figure 12G:
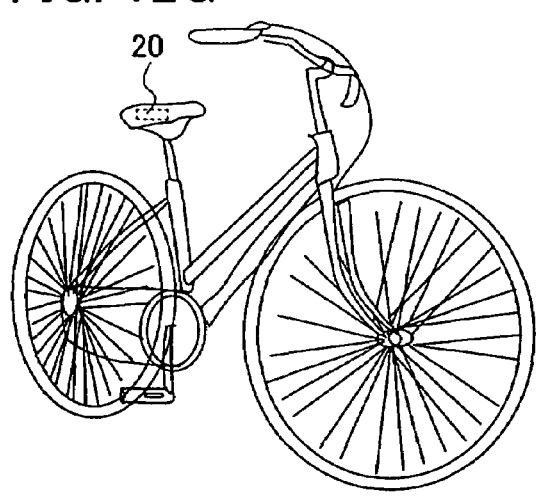
Figure 12H:
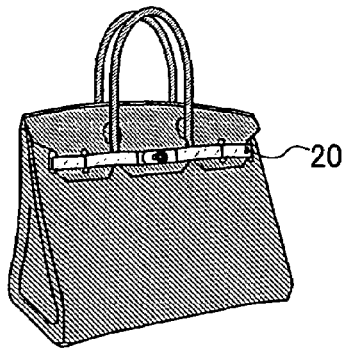

Next, an example of usage modes of a flexible semiconductor device which can input and output data without contact will be explained. A side face of a portable terminal including a display portion 3210 is provided with a reader/writer 3200, and a side face of an article 3220 is provided with a semiconductor device 3230 (see FIG. 11B). When the reader/writer 3200 is held over the semiconductor device 3230 included in the article 3220, information on the article 3220 such as a raw material, the place of origin, an inspection result in each production step, the history of distribution, or an explanation of the article is displayed on the display portion 3210. Furthermore, when a product 3260 is transported by a conveyor belt, the product 3260 can be inspected using a reader/writer 3240 and a semiconductor device 3250 attached to the product 3260 (see FIG. 11C). Thus, by utilizing the semiconductor device in a production control system, information can be acquired easily, and improvement in functionality and added value of the system can be achieved.

In addition, as a signal transmission method in the above-described semiconductor device which can input and output data without contact, an electromagnetic coupling method, an electromagnetic induction method, a microwave method, or the like can be used. The transmission method may be appropriately selected by a practitioner in consideration of an intended use, and an optimum antenna may be provided in accordance with the transmission method.

In the case of employing, for example, an electromagnetic coupling method or an electromagnetic induction method (for example, 13.56 MHz band) as the signal transmission method in the semiconductor device, a conductive film functioning as an antenna is formed in an annular shape (for example, a loop antenna) or a spiral shape (for example, a spiral antenna) in order to use electromagnetic induction caused by a change in magnetic field density.

In the case of employing a microwave method (for example, UHF band (860 to 960 MHz band), a 2.45 GHz band, or the like) as the signal transmission method in the semiconductor device, the shape such as a length of the conductive film functioning as an antenna may be appropriately set in consideration of a wavelength of an electromagnetic wave used for signal transmission. For example, the conductive film functioning as an antenna can be formed in a linear shape (for example, a dipole antenna), a flat shape (for example, a patch antenna), a ribbon-like shape, or the like. The conductive film functioning as an antenna, of which the shape is not limited to a linear shape, may be formed in a curved-line shape, a meander shape, or a combination thereof in consideration of the wavelength of the electromagnetic wave.

The conductive film functioning as an antenna is formed using a conductive material by a CVD method, a sputtering method, a printing method such as screen printing or gravure printing, a droplet discharge method, a dispenser method, a plating method, or the like. The conductive film is formed with a single-layer structure or a stacked layer structure using an element selected from aluminum, titanium, silver, copper, gold, platinum, nickel, palladium, tantalum, and molybdenum, or an alloy material or a compound material containing the element as its main component.

In the case of forming a conductive film functioning as an antenna by a screen printing method, for example, the conductive film can be formed by selectively printing a conductive paste in which conductor particles each having a grain size of several nm to several tens of μm are dissolved or dispersed in an organic resin. As the conductor particles, one or more metal particles of silver, gold, copper, nickel, platinum, palladium, tantalum, molybdenum, titanium, and the like; fine particles of silver halide; or dispersive nanoparticles can be used. In addition, as the organic resin contained in the conductive paste, one or a plurality of organic resins each functioning as a binder, a solvent, a dispersant, or a coating of the metal particle can be used. Typically, an organic resin such as an epoxy resin or a silicone resin can be used. When forming a conductive film, baking is preferably performed after the conductive paste is provided. For example, in the case of using fine particles (of which the grain size is grater than or equal to 1 nm and less than or equal to 100 nm) containing silver as its main component as a material of the conductive paste, a conductive film can be obtained by hardening the conductive paste by baking at temperatures in the range of 150 to 300° C. Alternatively, fine particles containing solder or lead-free solder as its main component may be used and it is preferable to use a fine particle having a grain size of less than or equal to 20 μm in this case. Solder or lead-free solder has an advantage such as low cost.

Besides the above-mentioned materials, ceramic, ferrite, or the like may be applied to an antenna. Alternatively, a material of which dielectric constant and magnetic permeability are negative in a microwave band (metamaterial) can be applied to an antenna.

In the case of applying an electromagnetic coupling method or an electromagnetic induction method, and providing a semiconductor device including an antenna so as to be in contact with a metal, a magnetic material having magnetic permeability is preferably provided between the semiconductor device and the metal. In the case of providing a semiconductor device including an antenna so as to be in contact with a metal, an eddy current flows in the metal accompanying a change in a magnetic field, and a demagnetizing field generated by the eddy current impairs the change in the magnetic field and decreases a communication range. For that reason, a material having magnetic permeability between the semiconductor device and the metal is provided, so that an eddy current of the metal is suppressed and a decrease in the communication range can be suppressed. It is to be noted that ferrite or a metal thin film having high magnetic permeability and little loss of high frequency wave can be used as the magnetic material.

It is to be noted that an applicable range of the flexible semiconductor device is wide in addition to the above, and the flexible semiconductor device can be applied to any product as long as it is a product whose production, management, or the like can be supported by clarifying information such as the history of an object without contact. For example, the semiconductor device can be mounted on paper money, coins, valuable securities, certificates, bearer bonds, packing containers, books, recording media, personal belongings, vehicles, food, clothing, health products, commodities, medicine, electronic devices, and the like. Examples of them will be explained with reference to FIGS. 12A to 12H.

The paper money and coins are money distributed in the market, and include one valid in a certain area (cash voucher), memorial coins, and the like. The valuable securities refer to checks, certificates, promissory notes, and the like (see FIG. 12A). The certificates refer to driver's licenses, certificates of residence, and the like (see FIG. 12B). The bearer bonds refer to stamps, rice coupons, various gift certificates, and the like (see FIG. 12C). The packing containers refer to wrapping paper for a box lunch and the like, plastic bottles, and the like (see FIG. 12D). The books refer to hardbacks, paperbacks, and the like (see FIG. 12E). The recording media refer to DVD software, video tapes, and the like (see FIG. 12F). The vehicles refer to wheeled vehicles such as bicycles, ships, and the like (see FIG. 12G). The personal belongings refer to bags, glasses, and the like (see FIG. 12H). The food refers to food articles, drink, and the like. The clothing refers to clothes, footwear, and the like. The health products refer to medical instruments, health instruments, and the like. The commodities refer to furniture, lighting equipment, and the like. The medicine refers to medical products, pesticides, and the like. The electronic devices refer to liquid crystal display devices, EL display devices, television devices (TV receivers, thin TV receivers), cellular phones, and the like.

When paper money, coins, securities, certificates, bearer bonds, and the like are provided with a semiconductor device 20, forgery can be prevented. When packing containers, books, recording media, personal belongings, food, commodities, electronic devices, and the like are provided with the semiconductor device 20, the efficiency of an inspection system, a system used in a rental shop, or the like can be improved. Forgery or theft can be prevented when vehicles, health products, and the like are provided with the semiconductor device 20. Medicine provided with the semiconductor device 20 can be prevented from being taken mistakenly. The semiconductor device 20 can be provided in such a manner that it is attached to the surface of the foregoing article or embedded therein, for example. In the case of a book, the semiconductor device 20 can be embedded in a piece of paper; in the case of a package made from an organic resin, the semiconductor device 20 is preferably embedded in the organic resin, for example. Even when paper and the like are provided with the semiconductor device having flexibility, breakage or the like of an element included in the semiconductor device can be prevented using the structure described in the above embodiment modes.

As described above, the efficiency of an inspection system, a system used in a rental shop, or the like can be improved when packing containers, recording media, personal belonging, food, clothing, commodities, electronic devices, and the like are provided with a semiconductor device. In addition, when vehicles are provided with a semiconductor device, forgery or theft can be prevented. Further, by implanting a semiconductor device in a creature such as an animal, an individual creature can be easily identified. For example, by implanting a semiconductor device with a sensor in a creature such as livestock, its health condition such as a current body temperature as well as its birth year, sex, breed, or the like can be easily managed.

It is to be noted that this embodiment mode can be freely combined with the above embodiment modes. In other words, the material or the formation method described in the above embodiment modes can be used in combination also in this embodiment mode, and the material or the formation method described in this embodiment mode can be used in combination also in the above embodiment modes.

Embodiment 1

Embodiment 1 will describe calculation results in the case where a laser oscillator, a correction lens, and a beam expander optical system having a zoom function are disposed as illustrated in FIG. 1, and the beam expander optical system is moved with respect to a point at which an image at an emission point of the laser oscillator is formed by the correction lens.

Figure 13:
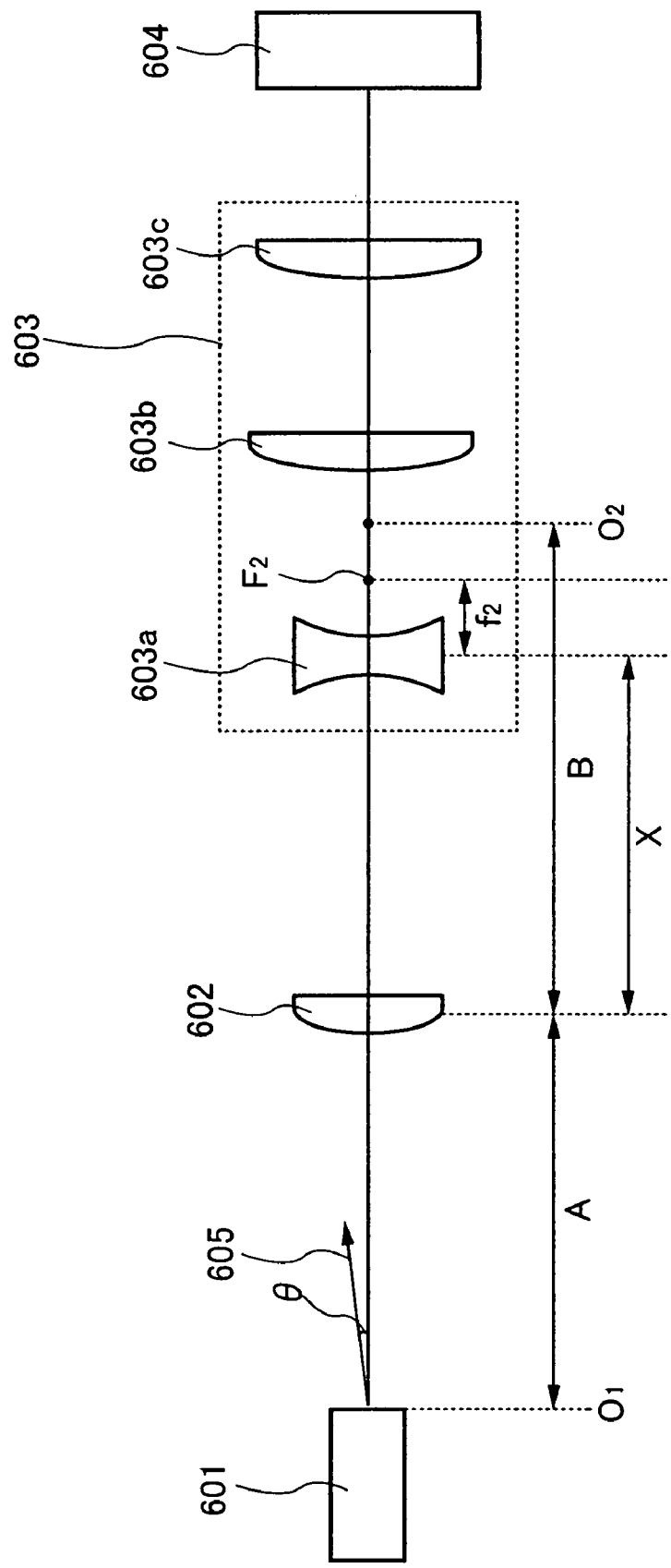
FIG. 13 illustrates an example of a laser light irradiation apparatus of the present invention.

First, an optical system, as illustrated in FIG. 13, in which a laser oscillator 601; a correction lens 602; a concave lens 603a as a first lens, a convex lens 603b as a second lens, and a convex lens 603c as a third lens included in a beam expander optical system 603; and an irradiated object 604 are disposed in order in a traveling direction of laser light oscillated from the laser oscillator 601, is assumed. When an angle of laser light 605 oscillated from the laser oscillator 601 shifts θ° with respect to a horizontal plane, an irradiation position of the laser light emitted to the irradiated object 604 in the cases of changing a position of the concave lens 603a (a distance X between the correction lens 602 and the concave lens 603a) was calculated. It is to be noted that comparisons of irradiation positions were conducted with θ=0° as a reference.

In the case where the laser light 605 oscillated from the laser oscillator 601 entered the concave lens 603a through the correction lens 602, when an emission point (or a beam waist or a light source) of the laser oscillator 601 was a first conjugate point $O_1$; a point at which an image at the first conjugate point $O_1$ was formed through the correction lens 602 was a second conjugate point $O_2$; a distance between the first conjugate point $O_1$ and the correction lens 602 was A; a distance between the correction lens 602 and the second conjugate point $O_2$ was B; and a focal length of the convex lens 603a was $f_2$, the calculation was conducted with A=B=500 mm and $f_2$=10.3 mm. In addition, a distance between the concave lens 603a and the convex lens 603b was kept fixed.

In addition, the calculation was conducted on the assumption that the curvature radiuses of the correction lens 602, the concave lens 603a, and the convex lenses 603b and 603c were 137 mm, 11.37 mm, and 271.5 mm, respectively, and the thicknesses of the correction lens 602, the concave lens 603a, and the convex lens 603b and 603c were 2.7 mm, 2.55 mm and 5.1 mm, respectively.

A calculation result of the irradiation position of the laser light with which the irradiated object 604 was irradiated in the case of θ=0.0017° is illustrated in Table 1. This value of θ was set in consideration of an error of an emission angle of the laser light oscillated from the laser oscillator 601 which was caused by the state of use environment such as a temperature change in the case where the laser oscillator, the correction lens and the beam expander optical system were actually disposed as illustrated in FIG. 13.

TABLE 1

| | X (mm) | Shift (mm) |
|---|---|---|
| 1 | 450 | 0.030 |
| 2 | 470 | 0.016 |
| 3 | 490 | 0.001 |
| 4 | 510 | −0.014 |
| 5 | 530 | −0.028 |

θ = 0.0017°

According to Table 1, in the case of θ=0.0017°, shift of the irradiation position of the laser light with which the irradiated object is irradiated can be considered to be sufficiently small when X is in the range of 470 mm to 490 mm, that is, when the second conjugate point $O_2$ is in the range of $2f_2$ in either a traveling direction of the laser light or the direction opposite to the traveling direction of the laser light from a focal point $F_2$ of the concave lens 603a. Further, in the case of X=490 mm (where the second conjugate point $O_2$ and the focal point $F_2$ of the concave lens 603a roughly overlap), the result in that the amount of the shift of the irradiation position of the laser light to the irradiated object was the smallest was obtained.

According to the above-described calculation results, even if the emission angle θ from the laser oscillator 601 is changed, the shift of the irradiation position of the laser light becomes sufficiently small when the second conjugate point $O_2$ is in the range of $2f_2$ in either a traveling direction of the laser light or the direction opposite to the traveling direction of the laser light from the focal point $F_2$ of the concave lens 603a. Further, when the second conjugate point $O_2$ and the focal point $F_2$ of the concave lens 603a roughly overlap, the shift of the irradiation position of the laser light to the irradiated object becomes the smallest. Accordingly, a correction lens is provided between a laser oscillator and a beam expander optical system and shift of an incidence position of laser light to a beam expander optical system is reduced, so that the shift of the irradiation position of the laser light to an irradiated object can be reduced.

Next, results of the case (see FIG. 14) where a convex lens 613a is substituted for the concave lens 603a, which was calculated similarly, will be described. The calculation was conducted using the convex lens 613a with a curvature radius of 11.37 mm, a thickness of 2.55 mm, and a focal length $f_2$ of 10.3 mm. Other conditions were set similarly to those of FIG. 13

Figure 14:
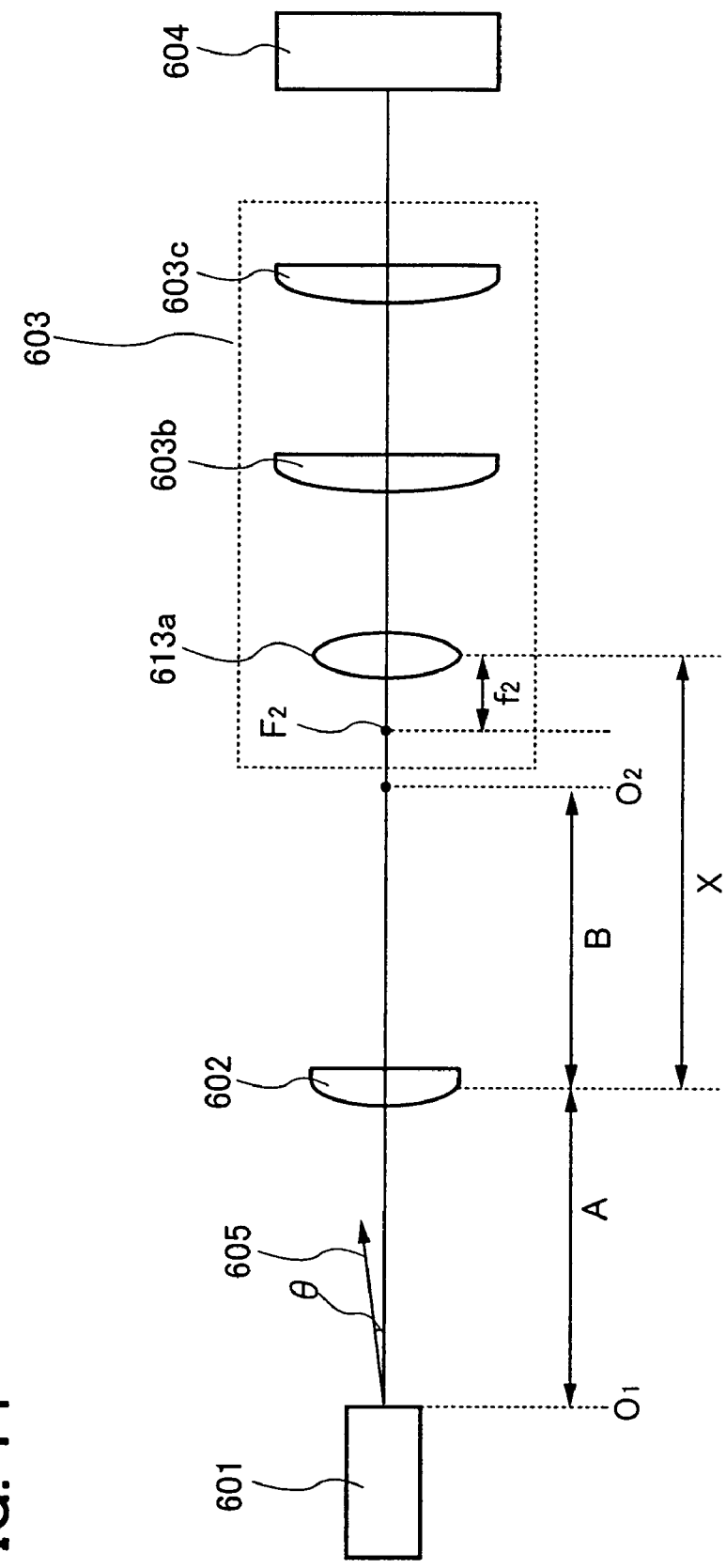
FIG. 14 illustrates an example of a laser light irradiation apparatus of the present invention.

A calculation result of the irradiation position of the laser light with which the irradiated object 604 was irradiated in the case of θ=0.0017° is illustrated in Table 2. This value of θ was set in consideration of an error of an emission angle of laser light oscillated from the laser oscillator 601 which was caused by the state of use environment such as a temperature change when the laser oscillator, the correction lens, and the beam expander optical system were actually disposed as illustrated in FIG. 14.

TABLE 2

| | X (mm) | Shift (mm) |
|---|---|---|
| 1 | 470 | −0.027 |
| 2 | 490 | −0.014 |
| 3 | 510 | −0.002 |
| 4 | 530 | 0.011 |
| 5 | 550 | 0.024 |

θ = 0.0017°

According to Table 2, in the case of θ=0.0017°, the shift of the irradiation position of the laser light with which the irradiated object is irradiated can be considered to be sufficiently small when X is in the range of 490 mm to 530 mm inclusive, that is, when the second conjugate point $O_2$ is in the range of $2f_2$ in either a traveling direction of the laser light or the direction opposite to the traveling direction of the laser light from a focal point $F_2$ of the convex lens 613a. Further, in the case of X=510 mm (where the second conjugate point $O_2$ and the focal point $F_2$ of the convex lens 613a roughly overlap), the result in that the amount of the shift of the irradiation position of the laser light to the irradiated object was the smallest was obtained.

According to the above-described calculation results, even in the case where the emission angle θ from the laser oscillator 601 is changed, the shift of the irradiation position of laser light becomes sufficiently small when the second conjugate point $O_2$ is in the range of $2f_2$ in a traveling direction of the laser light and the direction opposite to the traveling direction of the laser light from the focal point $F_2$ of the convex lens 613a. Further, when the second conjugate point $O_2$ and the focal point $F_2$ of the convex lens 613a roughly overlap, the shift of the irradiation position of the laser light to the irradiated object becomes the smallest. Accordingly, a correction lens is provided between a laser oscillator and a beam expander optical system, and shift of an incidence position of laser light to a beam expander optical system is reduced, so that the shift of the irradiation position of the laser light to an irradiated object can be reduced.

This application is based on Japanese Patent Application serial no. 2006-248975 filed in Japan Patent Office on Sep. 14, 2006, the entire contents of which are hereby incorporated by reference.

What is claimed is:

1. A laser light irradiation apparatus comprising:
   a laser oscillator;
   a beam expander optical system having a zoom function, wherein the beam expander optical system includes a first lens, a second lens, and a third lens in order in a traveling direction of laser light emitted from the laser oscillator;
   a lens disposed between the laser oscillator and the beam expander optical system; and
   a mechanism to change a distance between the first lens and the second lens in order to expand or reduce a beam diameter of the laser light,
   wherein the third lens is cooperated with the second lens to make the laser light parallel, and
   wherein, when an emission point of the laser oscillator is a first conjugate point, a point at which an image at the first conjugate point is formed through the lens disposed between the laser oscillator and the beam expander optical system is a second conjugate point, a distance between the lens, disposed between the laser oscillator and the beam expander optical system, and the second conjugate point is B, a focal length of the first lens is f, and a distance between the lens, disposed between the laser oscillator and the beam expander optical system, and the first lens is X, X satisfies $X=B-|f|$.

2. A laser light irradiation apparatus comprising:
   a laser oscillator;
   a beam expander optical system having a zoom function, wherein the beam expander optical system includes a first lens, a second lens, and a third lens in order in a traveling direction of laser light emitted from the laser oscillator;
   a lens disposed between the laser oscillator and the beam expander optical system; and
   a mechanism to change a distance between the first lens and the second lens in order to expand or reduce a beam diameter of the laser light,
   wherein the first lens is a lens that diverges an incident bundle of rays to a focus,
   wherein the third lens is cooperated with the second lens to make the laser light parallel, and
   wherein, when an emission point of the laser oscillator is a first conjugate point, a point at which an image at the first conjugate point is formed through the lens disposed between the laser oscillator and the beam expander optical system is a second conjugate point, a distance between the lens, disposed between the laser oscillator and the beam expander optical system, and the second conjugate point is B, a focal length of the first lens is f, and a distance between the lens, disposed between the laser oscillator and the beam expander optical system, and the first lens is X, X satisfies $B-3|f| \leq X \leq B+|f|$.

3. The laser light irradiation apparatus according to claim 2, wherein X satisfies $X=B-|f|$.

4. The laser light irradiation apparatus according to claim 2, wherein a distance between the laser oscillator and the first lens is greater than or equal to 0.5 m.

5. The laser light irradiation apparatus according to claim 2, wherein the third lens is a lens that converges an incident bundle of rays to a focus.

6. The laser light irradiation apparatus according to claim 2, wherein the lens disposed between the laser oscillator and the beam expander optical system is a lens that converges an incident bundle of rays to a focus.

7. The laser light irradiation apparatus according to claim 2, further comprising a diffractive optical element into which the laser light having passed through the beam expander optical system enters.

8. A laser light irradiation apparatus comprising:
   a laser oscillator;
   a beam expander optical system having a zoom function, wherein the beam expander optical system includes a first lens, a second lens, and a third lens in order in a traveling direction of laser light emitted from the laser oscillator;
   a lens disposed between the laser oscillator and the beam expander optical system; and
   a mechanism to change a distance between the first lens and the second lens in order to expand or reduce a beam diameter of the laser light,
   wherein the first lens is a lens that converges an incident bundle of rays to a focus,
   wherein the third lens is cooperated with the second lens to make the laser light parallel, and
   wherein, when an emission point of the laser oscillator is a first conjugate point, a point at which an image at the first conjugate point is formed through the lens disposed between the laser oscillator and the beam expander optical system is a second conjugate point, a distance between the lens, disposed between the laser oscillator and the beam expander optical system, and the second conjugate point is B, a focal length of the first lens is f, and a distance between the lens, disposed between the laser oscillator and the beam expander optical system, and the first lens is X, X satisfies $B-f \leq X \leq B+3f$.

9. The laser light irradiation apparatus according to claim 8, wherein, X satisfies $X=B+f$.

10. The laser light irradiation apparatus according to claim 8, wherein a distance between the laser oscillator and the first lens is greater than or equal to 0.5 m.

11. The laser light irradiation apparatus according to claim 8, wherein the third lens is a lens that converges an incident bundle of rays to a focus.

12. The laser light irradiation apparatus according to claim 8, wherein the lens disposed between the laser oscillator and the beam expander optical system is a lens that converges an incident bundle of rays to a focus.

13. The laser light irradiation apparatus according to claim 8, further comprising a diffractive optical element which the laser light having passed through the beam expander optical system enters.

14. A laser light irradiation method, comprising the steps of:
   emitting laser light from a laser oscillator;

making the laser light enter a lens disposed between the laser oscillator and a beam expander optical system having a zoom function; and making the laser light emitted from the lens disposed between the laser oscillator and the beam expander optical system enter a first lens, a second lens, and a third lens of the beam expander optical system in order in a traveling direction of the laser light emitted from the laser oscillator, wherein the first lens is a lens that diverges an incident bundle of rays to a focus wherein the second lens is moved to change a distance between the first lens and the second lens, thereby expanding or reducing a beam diameter of the laser light, wherein the third lens is cooperated with the second lens to make the laser light parallel, and wherein the laser oscillator, the lens disposed between the laser oscillator and the beam expander optical system, and the first lens are disposed so that, when an emission point of the laser oscillator is a first conjugate point, a point at which an image at the first conjugate point is formed through the lens disposed between the laser oscillator and the beam expander optical system is a second conjugate point, a distance between the lens, disposed between the laser oscillator and the beam expander optical system, and the second conjugate point is B, a focal length of the first lens is f, and a distance between the lens, disposed between the laser oscillator and the beam expander optical system, and the first lens is X, X satisfies $B-3|f| \leq X \leq B+|f|$.

15. The laser light irradiation method according to claim 14, wherein the laser light is emitted so that a distance between the laser oscillator and the first lens is greater than or equal to 0.5 m.

16. The laser light irradiation method according to claim 14, wherein the third lens is a lens that converges an incident bundle of rays to a focus.

17. The laser light irradiation method according to claim 14, wherein the lens disposed between the laser oscillator and the beam expander optical system is a lens that converges an incident bundle of rays to a focus.

18. The laser light irradiation method according to claim 14, further comprising a step of making the laser light having passed through the beam expander optical system enter into a diffractive optical element.

19. A laser light irradiation method, comprising the steps of:

emitting laser light from a laser oscillator;

making the laser light enter a lens between the laser oscillator and a beam expander optical system having a zoom function; and making the laser light emitted from the lens between the laser oscillator and the beam expander optical system enter a first lens, a second lens, and a third lens of the beam expander optical system in order in a traveling direction of the laser light emitted from the laser oscillator, wherein the first lens is a lens that converges an incident bundle of rays to a focus, wherein the second lens is moved to change a distance between the first lens and the second lens, thereby expanding or reducing a beam diameter of the laser light, wherein the third lens is cooperated with the second lens to make the laser light parallel, and wherein the laser oscillator, the lens between the laser oscillator and the beam expander optical system, and the first lens are disposed so that, when an emission point of the laser oscillator is a first conjugate point, a point at which an image at the first conjugate point is formed through the lens disposed between the laser oscillator and the beam expander optical system is a second conjugate point, a distance between the lens, disposed between the laser oscillator and the beam expander optical system, and the second conjugate point is B, a focal length of the first lens is f, and a distance between the lens, disposed between the laser oscillator and the beam expander optical system, and the first lens is X, X satisfies $B-f \leq X \leq B+3f$.

20. The laser light irradiation method according to claim 14, wherein the laser light is emitted so that a distance between the laser oscillator and the first lens is greater than or equal to 0.5 m.

21. The laser light irradiation method according to claim 19, wherein the third lens is a lens that converges an incident bundle of rays to a focus.

22. The laser light irradiation method according to claim 19, wherein the lens disposed between the laser oscillator and the beam expander optical system is a lens that converges an incident bundle of rays to a focus.

23. The laser light irradiation method according to claim 19, further comprising a step of making the laser light having passed through the beam expander optical system enter into a diffractive optical element.

24. A laser light irradiation apparatus comprising:

a laser oscillator;

a beam expander optical system having a zoom function, wherein the beam expander optical system includes a first lens, a second lens, and a third lens in order in a traveling direction of laser light emitted from the laser oscillator;

a lens disposed between the laser oscillator and the beam expander optical system; and a mechanism to change a distance between the first lens and the second lens in order to expand or reduce a beam diameter of the laser light, wherein the third lens is cooperated with the second lens to make the laser light parallel, and wherein, when an emission point of the laser oscillator is a first conjugate point, a point at which an image at the first conjugate point is formed through the lens disposed between the laser oscillator and the beam expander optical system is a second conjugate point, a distance between the lens, disposed between the laser oscillator and the beam expander optical system, and the second conjugate point is B, a focal length of the first lens is f, and a distance between the lens, disposed between the laser oscillator and the beam expander optical system, and the first lens is X, X satisfies $X=B+f$.

25. The laser light irradiation method according to claim 14, wherein X satisfies $X=B-|f|$.

26. The laser light irradiation method according to claim 19, wherein X satisfies $X=B+f$.

* * * * *

UNITED STATES PATENT AND TRADEMARK OFFICE
CERTIFICATE OF CORRECTION

PATENT NO. : 7,706,078 B2  
APPLICATION NO. : 11/896821  
DATED : April 27, 2010  
INVENTOR(S) : Koichiro Tanaka et al.

Page 1 of 1

It is certified that error appears in the above-identified patent and that said Letters Patent is hereby corrected as shown below:

column 1, line 64, "H741845" should read "H7-41845"

column 6, line 62, "a piano-convex lens" should read "plano-convex lens"

column 9, line 26, "use" should read "used"

column 10, line 33, "a piano-convex lens" should read "plano-convex lens"

column 13, line 7, "rhodium (Rb)" should read "rhodium (Rh)"

column 14, line 44-45, "oscillator pulsed laser oscillator)" should read "oscillator (pulsed laser oscillator)"

column 17, line 3-4, "the above described gate insulating layer is combined a thin film transistor" should read "the above-described gate insulating layer is combined, a thin film transistor"

column 22, line 10, "a power source battery)" should read "a power source (battery)"

column 29, line 12, claim 14, "to a focus" should read "to a focus,"

Signed and Sealed this  
Twenty-eighth Day of December, 2010

David J. Kappos  
*Director of the United States Patent and Trademark Office*